United States Patent Office 3,235,363
Patented Feb. 15, 1966

3,235,363
METHOD FOR THE CONTROL OF UNDESIRABLE VEGETATION
Raymond W. Luckenbaugh, Wilmington, Del., and Edward J. Soboczenski, Chadd's Ford, Pa., assignors to E. I. du Pont de Nemours and Company, Wilmington, Del., a corporation of Delaware
No Drawing. Filed May 1, 1964, Ser. No. 364,309
16 Claims. (Cl. 71—2.5)

This application is a continuation-in-part of copending applications Serial No. 48,563, filed August 10, 1960; Serial No. 89,672, filed February 16, 1961; and Serial No. 241,141, filed November 30, 1962, all now abandoned.

This invention relates to 1,3-disubstituted uracils and to compositions and methods for their use as herbicides. More particularly, this invention is directed to compositions and methods employing, as an active herbicidal ingredient, at least one compound of the formula (1)
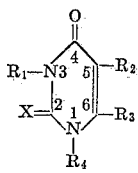

where
$R_1$ is alkyl of 1 through 10 carbon atoms,
  substituted alkyl of 1 through 8 carbon atoms,
  aryl of 5 through 10 carbon atoms,
  substituted phenyl,
  aralkyl of 5 through 13 carbon atoms,
  substituted aralkyl of 5 through 13 carbon atoms,
  alkenyl of 3 through 8 carbon atoms,
  alkynyl of 3 through 8 carbon atoms,
  cycloalkyl of 3 through 12 carbon atoms,
  substituted cycloalkyl of 3 through 12 carbon atoms,
  cycloalkenyl of 4 through 12 carbon atoms,
  substituted cycloalkenyl of 4 through 12 carbon atoms,
  cycloalkyl alkyl of 4 through 13 carbon atoms,
  cycloalkenyl alkyl of 5 through 13 carbon atoms,
  (substituted cycloalkyl)alkyl of 4 through 13 carbon atoms, and
  (substituted cycloalkenyl)alkyl of 5 through 13 carbon atoms;
$R_2$ is hydrogen, chlorine, fluorine, bromine, iodine, methyl, ethyl, propyl, butyl, methoxy, ethoxy, propoxy, butoxy, nitro,
  alkoxymethyl of 2 through 6 carbon atoms,
  hydroxy alkyl of 1 through 6 carbon atoms,
  alkenyl of 3 through 6 carbon atoms,
  thiocyanato, cyano, thiolmethyl, methylthiomethyl, phenylthiomethyl,
  alkylthio of 1 through 4 carbon atoms,
  bromomethyl, fluoromethyl, chloromethyl, or carboxymethylthiomethyl;
$R_3$ is hydrogen, chlorine, bromine,
  alkyl of 1 through 5 carbon atoms,
  chloralkyl of 1 through 4 carbon atoms,
  bromoalkyl of 1 through 4 carbon atoms, or
  alkoxy of 1 through 5 carbon atoms;
$R_4$ is alkyl of 1 through 5 carbon atoms,
  substituted alkyl of 1 through 5 carbon atoms,
  alkenyl of 2 through 5 carbon atoms,
  alkynyl of 3 through 5 carbon atoms,
  acyl of 1 through 10 carbon atoms,
  substituted acyl of 1 through 10 carbon atoms,
  carbamyl of 1 through 7 carbon atoms,
  substituted carbamyl of 1 through 7 carbon atoms,
  thiocarbamyl of 1 through 7 carbon atoms,
  substituted thiocarbamyl of 1 through 7 carbon atoms,
  dialkylphosphoryl of 2 through 6 carbon atoms,
  dialkylthionophosphoryl of 2 through 6 carbon atoms,
  alkylthio of 1 through 12 carbon atoms,
  substituted alkylthio of 1 through 12 carbon atoms,
  phenylthio of 6 through 10 carbon atoms,
  substituted phenylthio of 6 through 10 carbon atoms,
  benzylthio of 7 through 12 carbon atoms,
  substituted benzylthio of 7 through 12 carbon atoms, or glycosyl; and
X is oxygen or sulfur;

with the proviso that $R_2$ and $R_3$ can be taken together as —(CH$_2$)$_n$— to form a ring where $n$ is 3, 4, or 5, and with the further proviso that when $R_2$ is hydrogen, $R_1$ is an optionally substituted cycloalkyl of 3 through 12 carbon atoms or an optionally substituted cycloalkenyl of 4 through 12 carbon atoms or alkyl of 3 through 10 carbon atoms.

$R_4$ is shown as attached to the uracil ring in the 1-position. This is done with the understanding that it might be attached to the oxygen or sulfur in the 2-position. Present evidence on this point is inconclusive.

Within the scope of Formula 1 is a group of novel compounds having the formula (2)
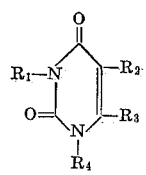

where
$R_1$ is as defined for Formula 1;
$R_2$ is fluorine, chlorine, bromine, iodine, or methyl;
$R_3$ is methyl or ethyl;
$R_4$ is perchloromethylmercapto, or acyl of 1 through 10 carbon atoms; and with the proviso that $R_2$ and $R_3$ by appropriate loss of hydrogen atoms from alkyl groups become part of a —(CH$_2$)$_n$— group to form a ring wherein $n$ is 3, 4, or 5.

The uracils of Formula 1 form water stable, novel complexes with phenol and substituted phenols. These complexes have the formula (3)
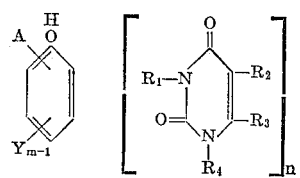

where
$R_1$ and $R_2$ are as defined in Formula 1,
$R_3$ is hydrogen or methyl,
$R_4$ is an alkyl radical of 1 through 5 carbon atoms,
A is hydrogen, bromine, chlorine, nitro, alkyl of 1 through 3 carbon atoms or an
  —OR$_5$ radical where $R_5$ is alkyl of 1 through 3 carbon atoms,
Y is chlorine or alkyl of 1 through 3 carbon atoms,
$m$ is a number 1 through 5, and
$n$ is ½, 1 or 2, with the proviso that $R_2$ and $R_3$ can be taken together to form a 5, 6, or 7 membered ring, and with the further proviso that when $R_2$ is hydrogen $R_1$ is an optionally substituted cycloalkyl of 3-12 carbon atoms or an optionally substituted cycloalkenyl of 4-12 carbon atoms or alkyl of 3-10 carbon atoms.

These complexes are also herbicidal, and in this respect, have some advantages over the uracils per se, viz., higher solubility in oils and solvents. They are formulated into herbicidal compositions in the same way as are the uracils themselves.

In Formulae 1, 2, and 3, the term "substituted alkyl" for $R_1$ is intended to include such radicals as Bromoalkyl of 1 through 10 carbon atoms
Chloroalkyl of 1 through 10 carbon atoms
Hydroxyalkyl of 1 through 10 carbon atoms
Alkoxyalkyl of 2 through 10 carbon atoms
Alkoxy carbonyl alkyl of 3 through 10 carbon atoms
Cyanoalkyl of 2 through 10 carbon atoms.

Similarly for $R_1$, the terms "aryl" and "substituted aryl" embrace radicals such as Phenyl
Naphthyl
o-Biphenyl
Pyridyl
Chlorophenyl
Bromophenyl
Dichlorophenyl
Dibromophenyl
Fluorophenyl
Trichlorophenyl
Alkylphenyl of 7 through 11 carbon atoms
Dialkylphenyl of 8 through 12 carbon atoms
Chloroalkylphenyl of 7 through 10 carbon atoms
Nitrochlorophenyl
Nitrophenyl
Dichloronitrophenyl
Chloroalkoxyphenyl of 7 through 11 carbon atoms
Trifluoromethylphenyl
Alkylnaphthyl of 11 through 16 carbon atoms
Chloronaphthyl
Tetrahydronaphthyl and
Indenyl.

For $R_1$, the terms "aralkyl" and "substituted aralkyl" are intended to include such radicals as Benzyl
Phenylalkyl of 8 through 11 carbon atoms (total)
Chlorobenzyl
Dichlorobenzyl
Alkylbenzyl of 8 through 11 carbon atoms (total)
Dialkylbenzyl of 9 through 13 carbon atoms (total)
Nitrobenzyl
Alkoxybenzyl of 8 through 11 carbon atoms (total) and
Naphthylmethyl.

For $R_1$, the terms "cycloalkyl," "cycloalkenyl," "cycloalkyl alkyl," and "cycloalkenyl alkyl" will include Cyclopropyl
Cyclohexyl
Cyclohexenyl
Cyclohexylalkyl
Cyclohexenylalkyl
Cyclopentyl
Cyclopentenyl
Cyclopentylalkyl
Cyclopentenylalkyl
Norbornyl
Norbornenyl
Norbornylalkyl
Norbornenylalkyl
Bicyclo (2,2,2) octyl
Bicyclo (2,2,2) octenyl
Bicyclo (2,2,2) octylalkyl
Bicyclo (2,2,2) octenylalkyl
Cyclopropyl
Cyclobutyl
Cyclooctyl
Cyclododecyl
Cyclobutylalkyl
Cyclobutenyl
Cyclobutenylalkyl
Hexahydroindanyl
Tetrahydroindanyl
Hexahydroindenyl
Hexahydroindenyl alkyl
Tetrahydroindanyl alkyl
Hexahydroindanyl alkyl
Hexahydro-4,7-methanoindenyl
Tetrahydro-4,7-methanoindanyl
Hexahydro-4,7-methanoindanyl
Tetrahydro-4,7-methanoindanyl
Hexahydro-4,7-methanoindanyl
Hexahydro-4,7-methanoindenyl alkyl
Tetrahydro-4,7-methanoindanyl alkyl
Hexahydro-4,7-methanoindanyl alkyl
Decahydronaphthyl
Decahydronaphthyl alkyl
Tetrahydronaphthyl
Tetrahydronaphthyl alkyl
Decahydro-1,4-methanonaphthyl
Decahydro-1,4-methanonaphthyl alkyl
Octahydro-1,4-methanonaphthyl
Octahydro-1,4-methanonaphthyl alkyl
Decahydro-1,4-5,8-dimethanonaphthyl
Decahydro-1,4-5,8-dimethanonaphthyl alkyl
Octahydro-1,4-5,8-dimethanonaphthyl
Octahydro-1,4-5,8-dimethanonaphthyl alkyl
Fenchyl and
Bornyl.

These cyclic substituents can be further substituted with alkyl groups containing 1 through 4 carbon atoms, methoxy, chlorine and bromine.

In Formula 1, the $R_4$ term, "substituted alkyl" is intended to include

Bromo alkyl 1–5 carbon atoms
Chloro alkyl 1–5 carbon atoms
Hydroxy alkyl 1–5 carbon atoms
Alkoxy alkyl 2–5 carbon atoms
Cyano alkyl 2–5 carbon atoms
Carboxy alkyl 2–5 carbon atoms
Alkoxy carbonyl alkyl of 3–6 carbon atoms
Alkyl of 1–5 carbon atoms.

In the foregoing list, the $R_4$ term, "substituted carbamyl and thiocarbamyl," includes structures of the type

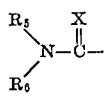

where
$R_5$ and $R_6$ are hydrogen, alkyl from 1 through 4 carbon atoms, phenyl, chlorophenyl, dichlorophenyl, and
X is oxygen or sulfur.

The term "acyl" includes structures of the type

where
$R_7$ is hydrogen,
alkyl of 1 through 9 carbon atoms,
chloroalkyl of 1 through 4 carbon atoms,
polychloroalkyl of 1 through 4 carbon atoms,
phenyl,
chlorophenyl of 1 through 3 chlorine atoms,
benzyl,
chlorobenzyl of 1 through 3 chlorine atoms,
phenoxy-methyl, or
chlorophenoxymethyl of 1 through 3 chlorine atoms.

By "substituted phenylthio and benzylthio" is intended to include such radicals for $R_4$ as Phenylthio
Benzylthio
Halophenylthio
Nitrophenylthio Alkylphenylthio of 7–10 carbon atoms
Chlorobenzylthio
Alkylbenzylthio of 8–12 carbon atoms By "substituted alkylthio" is intended to include such radicals for $R_4$ as
Chloroalkylthio of 1–12 carbon atoms
Bromoalkylthio of 1–12 carbon atoms
Alkylthio of 1–12 carbon atoms

PREPARATION OF COMPOUNDS

The uracils of Formula 1 are prepared by the reaction of 3-substituted; 3,5-substituted; 3,6-substituted or 3,5,6-substituted uracil or 2-thiouracil starting materials with various reactants, by methods well-known in the art.

The 3-substituted; 3,5-substituted; 3,6-substituted; and 3,5,6-substituted uracil and 2-thiouracil starting materials can be prepared according to the following schemes:

*Preparation of 3-substituted uracils*

(4)
$$sec.\text{-}C_4H_9NHC(O)\text{-}NH_2 + CH(OC_2H_5)_3 + CH_2(CN)_2 \longrightarrow$$
$$sec.\text{-}C_4H_9\text{-}NHC(O)\text{-}NHCH{=}C(CN)_2$$

(5)
$$sec.\text{-}C_4H_9NHC(O)\text{-}NHCH{=}C(CN)_2 + NaOCH_3 \xrightarrow{C_2H_5OH}$$

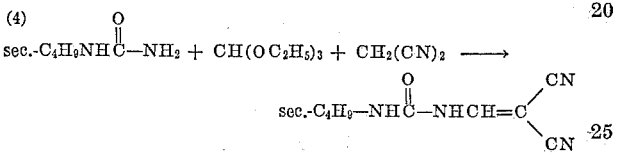

(6) 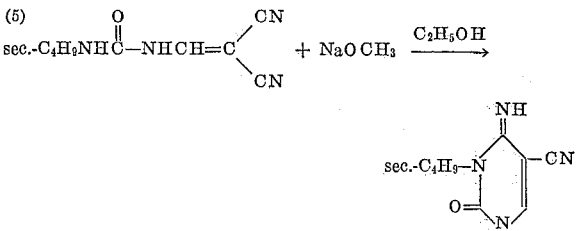

(7) 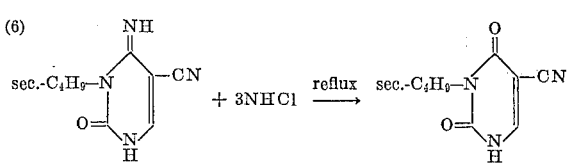

(8) 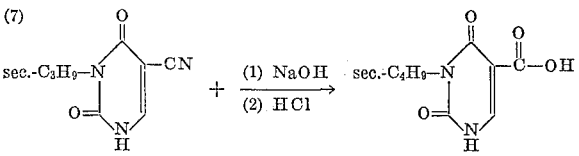

In Equation 4, a mixture of malononitrile, sec.-butylurea and triethyl orthoformate, in molar ratios of 1:1:3, is heated at 70° C. to 100° C. with stirring for 1 to 3 hours. The excess ortho ester and ethanol are then removed at reduced pressure. The residue consists of essentially pure [(3-butylureido)methylene]malononitrile.

This is dissolved in alcohol and converted to 3-sec.-butyl-5-cyanocytosine by treatment with sodium methoxide as illustrated in Equation 5.

The 3-sec.-butyl-5-cyanocytosine is converted to the corresponding uracil according to Equation 6 by a 3-hour reflux with 3 N hydrochloric acid. The uracil crystallizes from the aqueous solution on cooling.

On refluxing the 3-sec.-butyl-5-cyanouracil with an excess of 25% sodium hydroxide solution, the nitrile is hydrolyzed according to Equation 7 with the formation of 3-sec.-butyl-5-uracil carboxylic acid.

The acid is easily decarboxylated by heating it at a temperature above its melting point. This is illustrated by Equation 8. The resulting 3-sec.-butyluracil is purified by recrystallization from such solvents as nitromethane or carbon tetrachloride.

*Preparation of 3,5-substituted uracils*

(9) 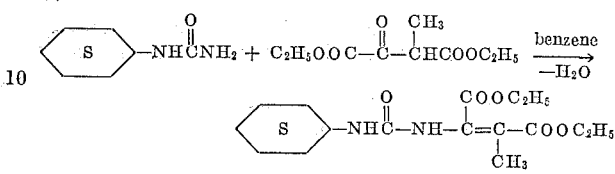

(10) 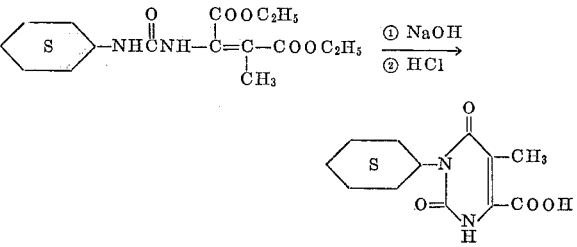

(11) 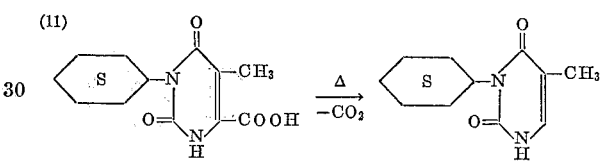

The cyclohexylurea of Equation 9 is condensed with the α-methyloxalacetate in an inert solvent such as benzene, and in the presence of an acidic catalyst such as phosphoric acid.

This reaction mixture is heated until approximately the theoretical amount of water has been removed. The solvent is then removed and the residue is heated at reflux with a slight excess of aqueous sodium hydroxide, whereupon ring closure takes place, as illustrated in Equation 10.

The resulting uracil carboxylic acid is decarboxylated to the desired uracil, according to Equation 11, by heating it above its melting point, either by itself or in an inert high-boiling-point liquid such as dibutyl phthalate or a eutectic mixture of diphenyl and diphenyl ether.

*Preparation of 3,6- and 3,5,6-substituted uracils*

(12) 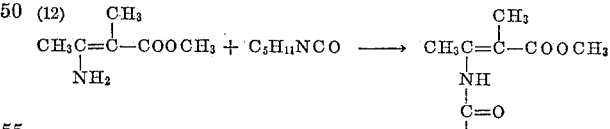

(13) 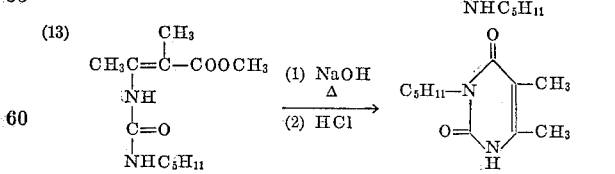

For more general details, note the publication by Behrend and Myer in Ann., 314, 219 (1901), and also Ber., 33, 622 (1900).

In this method the esters of β-amino-α,β-unsaturated acids are first prepared by reacting the corresponding β-keto esters with aqueous ammonia [Conrad and Epstein, Ber., 20, 3054 (1887)]. These properly substituted β-amino-α,β-unsaturated esters are then reacted with an isocyanate or isothiocyanate in an inert solvent such as toluene or xylene, and heated for a short interval of time at reflux temperature.

The reaction mixture is chilled, filtered, and the filtrate distilled to remove the solvent. Generally, a viscous liquid residue remains which is crude 3-(3-substituted-ureido)-α,β-unsaturated ester. This can be reacted without further purification with an alcoholic alkaline solution at reflux temperature to bring about the desired uracil ring closure. At this point, the reaction is diluted with water, made slightly acidic with a strong acid such as hydrochloric acid, and distilled to remove the alcohol. After the remaining aqueous solution has been chilled, the corresponding substituted uracil separates as an essentially pure solid.

The 3,6-substituted uracil can also be prepared according to the following equations:

(14)
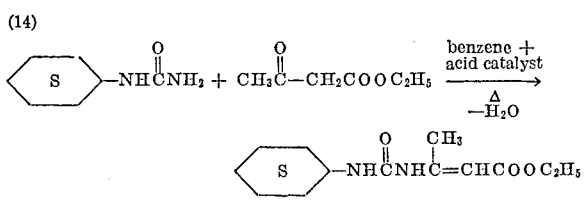

(15)
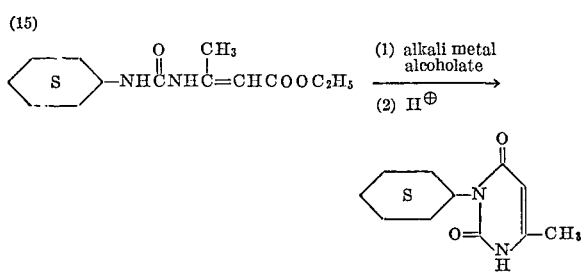

According to Equations 14 and 15, an appropriately substituted urea or thiourea is reacted with a β-keto ester or an α-substituted β-keto ester substituted with such radicals as alkoxy, fluorine, alkyl, or alkenyl, and an acid catalyst, at reflux in a solvent from which water is removed continuously. After all the water has been removed, the solution is stripped and taken up in ethanol containing a base such as sodium methoxide. After a few minutes reflux, the solvent is removed, and the residual oil taken up in water and acidified, whereupon the desired product separates in crystalline form.

The 3,5,6-substituted uracils which are substituted in the 5-position with halogen, nitro, thiocyanato, chloromethyl and hydroxymethyl groups can be prepared from these 3,6-substituted uracils by methods heretofore described in the literature for related compounds.

For example, the preparation of those compounds having a halogen substituent in the 5-position is illustrated by the following equation. For more general details, see J. Am. Chem. Soc., 61, 1015 (1939); Ann., 305, 314; Ann., 352, 242; and Ann., 441, 192.

(16)
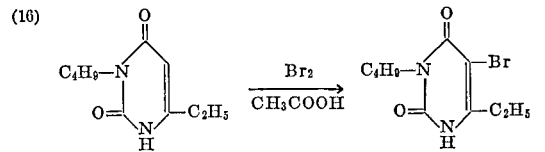

The 5-nitro uracils are prepared by direct nitration of uracils having no substituent in the 5-position, as illustrated in Equation 17. For a description of this method, see J. Am. Chem. Soc., 30, 1156 (1908).

(17)
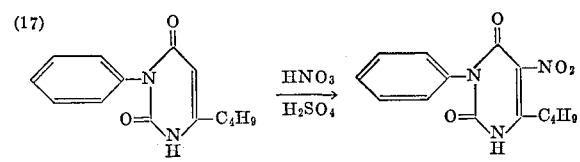

The 5-thiocyano uracils are prepared by direct thiocyanogenation as illustrated by Equation 18. For more details concerning this procedure, see J. Am. Chem. Soc., 63, 2323 (1941); Org. Syntheses, Coll. vol. II, 574 (1943); and Helv. Chim. Acta, 19, 1411 (1936).

(18)
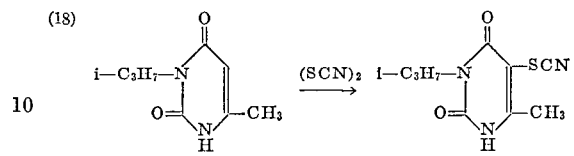

The 5-hydroxymethyl uracils are prepared by reaction with formaldehyde as illustrated by Equation 19. For greater detail see Gazz. Chim. Ital., 79,447 (1949).

(19)
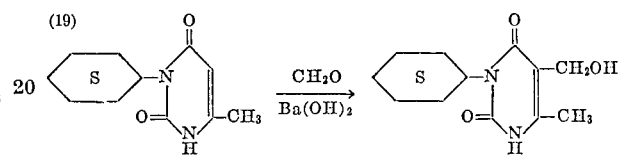

These 5-hydroxymethyl uracils can be easily reacted with alcohols, methyl mercaptan, thiophenols, thionyl chloride, or mercaptoacetic acid to give corresponding 5-alkoxymethyl, -methylthiomethyl, -phenylthiomethyl, -chloromethyl, and -carboxymethyl-thiouracils.

6-chlorouracil, prepared by acidic hydrolysis of 2,4-dimethoxy-6-chloropyrimidine (see British Patent 677,342), can serve as an intermediate for the preparation of many of the uracil starting materials. The following diagram illustrates this:

(20)
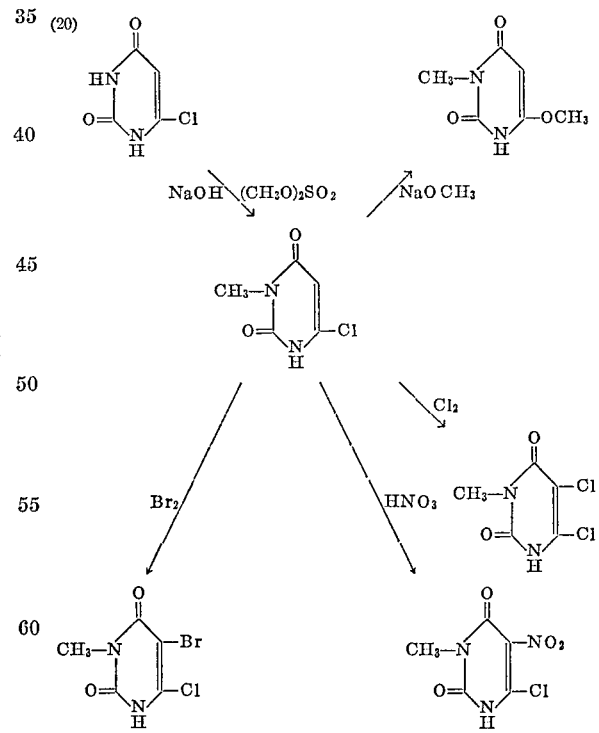

Methods for carrying out the reactions illustrated in the foregoing diagram are well described in pyrimidine literature. These reactions, as well as many related ones, will be easily carried out by those skilled in this field of chemistry.

*Conversion to 1-substituted uracils*

The 3-substituted; 3,5-substituted; 3,6-substituted and 3,5,6-substituted uracil starting reactants prepared as described above are then converted into the compounds of Formula 1 by substitution reactions of known types. The following reactants can, for example, be used:

| Reactant | Resulting R₄ group |
|---|---|
| Ketene | CH₃—C(=O)— |
| Trichloroacetyl chloride plus acid acceptor (or other acyl chlorides). | CCl₃—C(=O)— |
| 2,2-dichloropropionyl chloride plus acceptor | CH₃—CCl₂—C(=O)— |
| Ethylene oxide or ethylene carbonate | HO—CH₂—CH₂— |
| β-Propiolactone (and other lactones) | HO—CH₂—CH₂—C(=O)— |
| Trichloromethanesulfenyl chloride (and other sulfenyl halides). | Cl₃C—S— |
| Dimethyl sulfate (and other dialkyl sulfates or alkyl halides). | CH₃— |
| Diethyl sulfate | C₂H₅— |
| Higher alkyl halides | Alkyl. |
| Isocyanates | R—N(H)—C(=O)— |
| Isothiocyanates | R—N(H)—C(=S)— |
| Dialkylcarbamoyl chloride | (R)₂N—C(=O)— |
| Dialkylphosphoryl chloride | (RO)₂—P(=O)— |
| Dialkylthionophosphoryl chloride | (RO)₂—P(=S)— |

In many cases, the substituted uracil starting materials can be reacted with these reactants directly, without use of a solvent or catalyst. It is usually preferable, however, to use a solvent, because it facilitates handling of material, moderates the reaction, and aids in maintaining the desired reaction temperatures.

It is sometimes necessary to use an equivalent amount of a base such as sodium hydroxide to promote the reaction. When sodium hydroxide is used as a base catalyst, the reaction can be carried out in water. When bases such as sodium hydride are used, the reaction must be carried out in an anhydrous system such as dioxane, toluene, benzene, or xylene.

Descriptions of methods for preparing uracils substituted in the 1-position with alkyl, perchloromethylmercapto, acyl, aroyl, hydroxymethyl, arylsulfenyl, carbamyl, and ω-carboxyalkyl radicals are found in U.S. Patent 2,553,770
JOC, 14, 1099 (1949)
J.A.C.S., 52, 2006 (1930)
J.A.C.S., 54, 2436 (1952)

The compounds of Formula 1 substituted in the 1-position with an alkyl group can be prepared by the reaction of a dialkyl sulfate with a sodium salt of a substituted uracil starting material, as illustrated in the following equation:

(21)
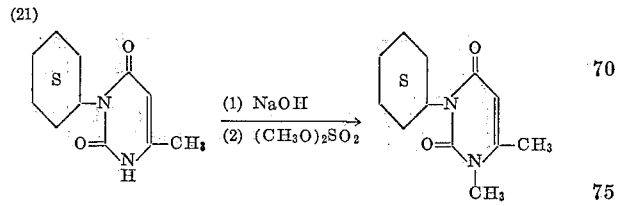

A more detailed description of this reaction will be found in Journal of the American Chemical Society, 52, 2006 (1930).

The 1-alkyl uracils can also be prepared according to the following equation:

(22)
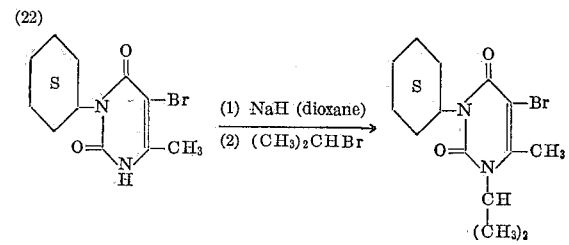

The uracils which bear a trichloromethylthio group in the 1-position can be prepared according to the following illustrative equation:

(23)
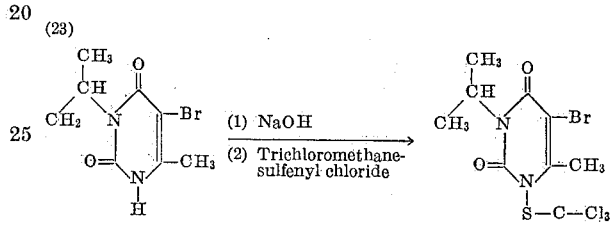

The uracil produced according to this equation precipitates almost immediately upon addition of trichloromethanesulfenyl chloride to the aqueous alcoholic solution of the uracil sodium salt. This method is outlined in greater detail in U.S. Patent 2,553,770.

The uracils substituted in the 1-position with an acetyl group can be prepared by treating a solution of a substituted uracil starting material in acetone with ketone according to the following illustrative equation:

(24)
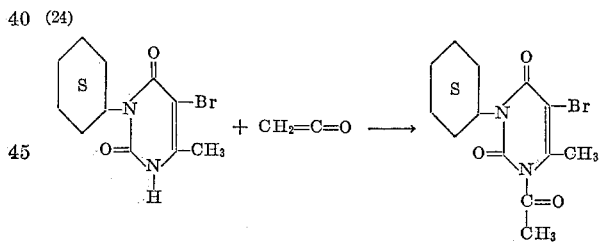

This reaction is usually rapid and exothermic.

The substituted uracil starting materials also react with acid chlorides to give uracils substituted in the 1-position. This reaction is illustrated by the following equation:

(25)
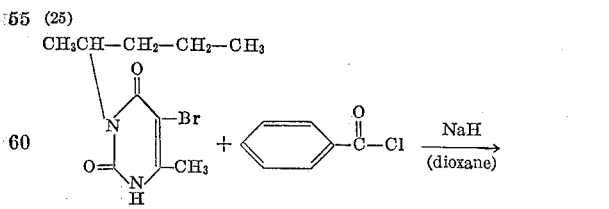

Acyl chlorides, O,O-dialkyl phosphoryl chlorides, and dialkyl carbamyl chlorides also react with substituted uracil starting materials in this fashion to give the corresponding 1-substituted products. In addition to dioxane, solvents such as dimethyl formamide and ansul ether may also be used. When the reaction is exothermic little or no external heat need be applied. When the reaction is not exothermic the reaction may be carried out at the refluxing temperature of the solvent employed.

In many cases it is convenient to react the dry uracil sodium salt with the acid chlorides directly, utilizing an excess of the acid chloride as a solvent to moderate the reaction. The sodium salt may be prepared by dissolving the uracil in water or a mixture of water and alcohol containing an equivalent of sodium hydroxide, and evaporating the solution to dryness. The reaction between the sodium salt of the uracil and the acid chloride takes place conveniently at the refluxing temperature of the acid chloride. The reaction time is particularly short when the temperature is in the range of 150–230°.

On cooling the product generally crystallizes and may be washed free of excess acid chloride with such solvents as cyclohexane, carbon tetrachloride or pentane. Alternatively the excess acid chloride may be distilled off at reduced pressure. The inorganic salts are washed away with water and the product may be recrystallized from nitromethane, chlorethene, alcohol, cyclohexane or acetonitrile.

The 1-hydroxymethyl uracils can be prepared by the reaction of formaldehyde with a substituted uracil starting material, as illustrated by the following equation:

(26)
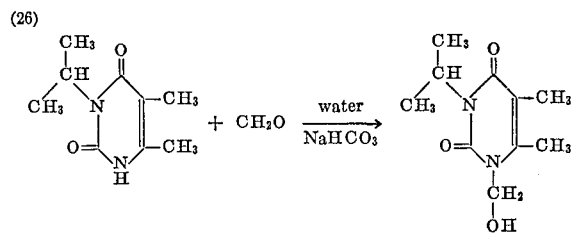

The substituted uracil starting materials can also be reacted with the alkyl and aryl sulfenyl chlorides which are less active than perchloromethylmercaptan. This reaction is carried out under anhydrous conditions according to the following illustrative equation:

(27)
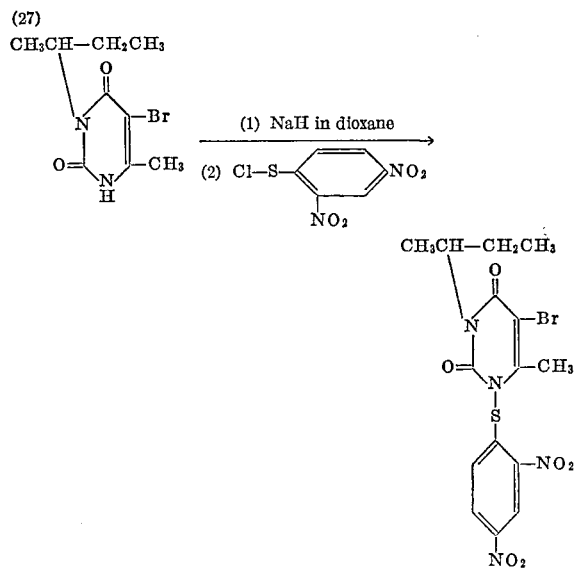

The 1-carbamyl substituted uracils are obtained by reacting an isocyanate or isothiocyanate with a substituted uracil starting material in an inert solvent at elevated temperatures, as illustrated by the following equation:

(28)
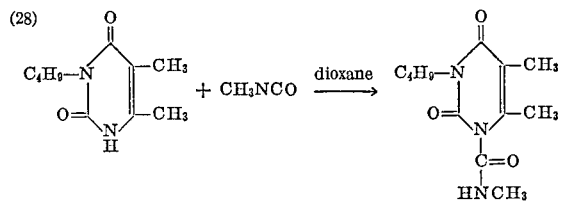

The uracils substituted in the 1-position with a propionic acid grouping can be prepared by reacting a substituted uracil starting material with β-propiolactone in a dry inert solvent. This reaction is illustrated by the following equation:

(29)
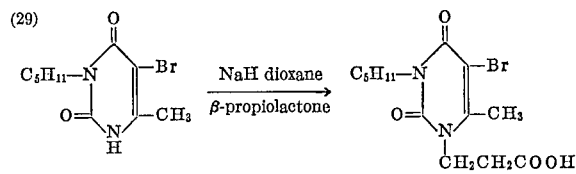

Alternatively, β-propiolactone reacts with the uracil starting materials in aqueous alkaline media at ambient temperatures. The product is precipitated from the water solution by addition of acid, is filtered, dried, and may be recrystallized from such solvents as acetonitrile and alcohol if desired.

Uracils substituted in the 1-position with a β-hydroxyethyl grouping can be prepared by reacting the sodium salt of a substituted uracil starting material with ethylene carbonate in dimethyl formamide. The reaction is illustrated by the following reaction:

(30)
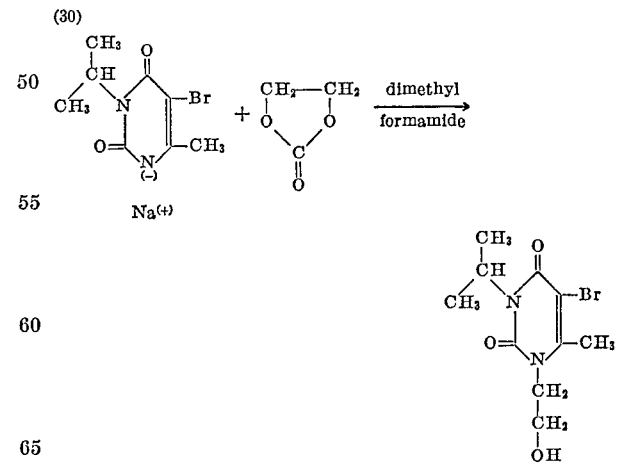

More detail concerning the above reaction may be found in Collection Czechoslov. Chem. Communs., 27, 1054–6 (1942).

All of the foregoing equations are intended to be representative only of the general pathways by which the compounds of this invention can be prepared. It is obvious that there are many variations of these illustrated reactions, and that one skilled in the art can easily prepare any desired uracil of this invention by making proper substitutions in the illustrated modes.

The complexes of Formula 3 are formed by co-melting the uracil and phenol in a ½:1, 1:1 or 2:1 (uracil:phenol) ratio. They can also be formed by co-dissolving the reactants, in the same ratio, in a non-polar inert solvent such as nitromethane or a mixture of nitromethane and cyclohexane.

When a solvent is used, the phenol and substituted uracil are added to the solvent, with stirring. Stirring is continued until reaction is complete. Heating can be employed to speed up the reactions.

Some of the complexes precipitate from the reaction mixture and can be isolated by filtration. Others, which are soluble in the solvent used, can be isolated by evaporation of the solvent, preferably in vacuo.

The crude complexes are suitable for herbicidal application without further purification. However, they can, if desired, be recrystallized from such solvents as cyclohexane or benzene.

UTILITY

These uracils represent a new class of herbicides offering farmers and property-owners a new and effective method for the control of undesirable vegetation. These compounds are unique in that they exert their action against both broadleaf and grass weeds, are effective against hard-to-kill nutsedge and perennial grasses such as quack grass, Johnson grass, and Bermuda grass, and are effective on highly adsorptive substrates such as railroad ballast, heavy clay soil, and soils high in organic matter.

This combination of properties makes these compounds useful wherever general weed control is required, such as industrial areas, railroad rights-of-way, and areas adjacent to crop-lands in agricultural areas.

Certain of the uracils also exhibit selective herbicidal action in crops. By properly selecting a uracil of the invention and a rate and time of application, annual grass and broadleaf seedlings in such crops as cotton, carrots, asparagus, corn, flax, sugar cane, pineapple, safflower, peanuts, citrus, alfalfa, strawberry and gladiolus can be controlled.

By proper selection of rate and time of application, certain of the uracils can also be used to control weeds growing in dormant crops.

This selective activity and activity on weeds growing in dormant crops is described in more detail in the examples.

Many of the compounds have unusually high oil solubility, and so are useful for application in oils such as herbicidal oils, diesel oil, kerosene, xylene, and other commercially available spray oils. High oil solubility makes shipment of uracil oil "concentrates" practical. Such concentrates can be diluted with low-cost diesel oil and herbicidal oils at the site of application.

The precise amounts of uracils to be used in any given situation will, of course, vary according to the particular end result desired, the use involved, the plant and soil involved, the formulation used, the mode of application, prevailing weather conditions, foliage density and like factors. Since so many variables play a role, it is not possible to indicate a rate of application suitable for all situations. Broadly speaking, the compounds are used at levels of about ¼ pound per acre to about 80 pounds per acre.

When they are used in pre-emergence treatments, the uracils are used at concentrations of from ¼ to 5 pounds of active ingredient per acre.

When used in soil-foliage applications, the uracils are used at concentrations of from 4 to 80 pounds of active ingredient per acre.

For selective weed control in crops, rates of ¼ to 8 pounds per acre will generally be used.

More of the active material can, of course, be used to control difficult-to-kill species growing under adverse conditions. Economic factors, such as inaccessibility of the area to be treated, e.g., fire breaks in forests, may also favor higher rates, with less frequent treatments.

Preferred for use as herbicides because of their effectiveness are compounds of the formula

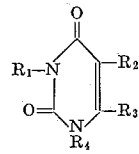

where $R_1$ is cycloalkyl, cycloalkyl alkyl, cycloalkenyl, phenyl or

Where

A is methyl or ethyl,
Y is hydrogen or methyl, and
Z is alkyl of 1 through 4 carbon atoms;
$R_2$ is halogen, methyl, nitro, hydroxymethyl, and methoxymethyl;
$R_3$ is methyl and
$R_4$ is trichloromethylthio, acyl as defined for $R_4$ in Formula 1, and alkyl of 1 through 4 carbon atoms; and provided that $R_2$ and $R_3$ by appropriate loss of hydrogen atoms become part of a—$(CH_2)_n$— group to form a ring wherein $n$ is 3, 4, or 5.

Especially preferred because of their effectiveness are
3-(1-lower alkylethyl)-5-halogeno-1,6-dimethyluracils
3-(1-lower alkylethyl)-5-halogeno-1-(acyl)-6-methyluracils
3-(1-lower alkylethyl)-5-halogeno-1-trichloromethylthio-6-methyluracils
3-phenyl-5-halogeno-1-trichloromethylthio-6-methyluracils
3-cycloakyl-5-halogeno-1,6-dimethyluracils
3-cycloalkyl-5-halogeno-1-trichloromethylthio-6-methyluracils
3-phenyl-5-halogeno-1-(acyl)-6-methyluracils
3-cycloalkyl-5-halogeno-1-(acyl)-6-methyluracils
3-cycloalkyl alkyl-5-halogeno-1,6-dimethyluracils

Herbicidal composition

The compounds of Formulae 1 through 3 can be used with a carrier or diluent such as a finely divided solid, a solvent liquid of organic origin, a non-solvent liquid of organic origin, water, a wetting agent, a dispersing agent, an emulsifying agent, an aqueous emulsion or any suitable combinations of these.

Compositions of the invention, especially liquids and wettable powders, contain as a conditioning agent one or more surface-active agents in amounts sufficient to render a given composition containing the compounds of Formulae 1 through 3 readily dispersible in water or in oil. By the term "surface-active agent," it is understood that wetting agents, dispersing agents, suspending agents and emulsifying agents are included.

Suitable surface-active agents are set out, for example, in Searle U.S. Patent 2,426,417, Todd U.S. Patent 2,655,447, Jones U.S. Patent 2,412,510, or Lenher U.S. Patent 2,139,276. A detailed list of such agents is set forth by J. W. McCutcheon in "Soap and Chemical Specialities," December 1957, January, February, March, and April 1958. See also McCutcheon in "Chemical Industries," November 1947, pages 8011 et seq., entitled, "Synthetic Detergents"; "Detergents and Emulsifiers—

1963 Annual," by John W. McCutcheon, Inc., and Bulletin E–607 of the Bureau of Entomology and Plant Quarantine of the U.S. Department of Agriculture. In general, less than 10 percent by weight of the surface-active agent is present in the compositions of this invention, although usually the amount of surface-active agent in these compositions is not more than 5 percent by weight. However, levels as high as 4 parts of surfactant for each part of uracil gives unusual and unexpected beneficial results. Such compositions have greater herbicidal effectiveness than can be expected from a consideration of the activity of the components used separately.

Several different types of compositions containing the compounds of Formulae 1 through 3 have been developed so that the compounds of Formulae 1 through 3 can be used to greatest advantage as herbicides. These preferred formulations comprise certain wettable powders, certain aqueous or oil suspensions, certain dusts, certain emulsifiable oils, solutions in certain solvents, and certain granules and pellets. In general, these preferred compositions will all usually contain a wetting agent, a disperasnt, or an emulsifying agent.

Wettable powders are water-dispersible compositions containing the active material, an inert solid extender, and one or more surfactants to provide rapid wetting and prevent heavy flocculation when suspended in water.

The inert extenders which should be used in the preferred wettable powders of this invention containing the compounds of Formulae 1 through 3 are preferably of mineral origin and the surfactants are preferably anionic or non-ionic.

Suitable surfactants for use in such compositions are listed by J. W. McCutcheon in "Soap and Chemical Specialties," December 1957, January, February, March, and April 1958, and "Detergents and Emulsifiers—1963 Annual," by John W. McCutcheon, Inc. The classes of extenders most suitable for the wettable powder formulations of this invention are the natural clays, diatomaceous earth, and synthetic mineral fillers derived from silica and silicate. Among non-ionic and anionic surfactants, those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred fillers for this invention are kaolinites, attapulgite clay and synthetic magnesium silicate. Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils ditertiary acetylenic glycols and ethers of polyethylene glycol with long chain alcohols and phenols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium-N-methyl-N-(long chain acid) taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations of the invention will contain from about 25 to 90 weight percent active material, from 0.5 to 3.0 weight percent wetting agent, from 0.25 to 5.0 weight percent dispersant, and from 2 to 74.25 weight percent inert extender, as these terms are described above.

When the wettable powder contains a corrosion inhibitor or an anti-foaming agent or both, the corrosion inhibitor will not exceed about 1 percent of the composition, both replacing equivalent amounts of the inert extender.

Aqueous suspensions are prepared by mixing together and sandgrinding or ball milling an aqueous slurry of water-insoluble active ingredient in the presence of dispersing agents to obtain a concentrated slurry of very finely divided particles, in which the active ingredient is substantially all below 5 microns in size. The resulting concentrated aqueous suspension is characterized by its extremely small particle size, so that when diluted and sprayed, coverage is very uniform. Thickening agents such as gelling type clays may also be included to further reduce the settling out of particles.

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the compounds of this invention, the inert extender may be either of vegetable or mineral origin, the wetting agent is preferably anionic or non-ionic, and suitable absorptive grinding aids are of mineral origin.

Suitable classes of inert solid extenders for use here are those organic or inorganic powders which possess high bulk density and are very free-flowing. They are also characterized by possessing relatively low surface areas and are poor in liquid absorption. Suitable classes of grinding aids are some natural clays, diatomaceous earths, and synthetic mineral fillers derived from silica or silicates. Among ionic and non-ionic wetting agents, the most suitable are the members of the group known to the art as wetting agents and emulsifiers. Although solid agents are preferred because of ease in incorporation, some liquid non-ionic agents are also suitable in this invention.

Preferred inert solid extenders for the dusts of this invention are micaceous talcs, pyrophyllite, dense kaolin clays, ground calcium phosphate rock such as that known as "Phosphodust" (a trademark of the American Agricultural Chemical Company) and tobacco dust.

Preferred grinding aids are attapulgite clay, diatomaceous silica, synthetic fine silica and synthetic calcium and magnesium silicates. Preferred wetting agents are those previously listed under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 2 to 20 weight percent active material, 0 to 50 weight percent absorptive filler, 0 to 1.0 weight percent wetting agents, and about 30 to 98 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

Emulsifiable oils are usually solutions of active material in non-water miscible solvents together with a surfactant.

For the compounds of this invention, emulsifiable oils can be made by mixing the active ingredient with a solvent and surfactant. Suitable solvents for the compounds of this invention are hydrocarbons (substituted or unsubstituted), and non-water miscible ethers, esters, or ketones. Suitable surfactants are those anionic or non-ionic agents known to the art as emulsifying agents. Such compounds can be found listed by J. W. McCutcheon in "Soap and Chemical Specialties," for December 1957, and January, February, March, and April 1958, and in "Detergents and Emulsifiers—1963 Annual," by J. W. McCutcheon, Inc.

Emulsifying agents most suitable for the compositions of this invention are alkyl aryl polyethoxy alcohols, alkyl and alkyl aryl polyether alcohols, polyoxyethylene sorbitol or sorbitan fatty alkylol amide condensates, amine salts of fatty alcohol sulfates plus long chain alcohols and oil soluble petroleum sulfonates. Such emulsifying agents will comprise from about 3 to 10 weight percent of the total composition. As described above, however, up to 4 parts of emulsifying agent for each part of uracil can be used to give synergistic results.

Preferred solvents included hydrocarbons of the aromatic type such as xylene and heavy aromatic naphthas, and ketones such as isophorone.

Thus, emulsifiable oil compositions of the present invention will usually consist of from about 15 to 50 weight percent active material, about 2 to 10 weight percent emulsifier, as these terms are defined and used above.

Oil suspensions consist of finely divided active ingredient dispersed in non-solvent organic liquids, e.g., those in which the dispersed active has a solubility of less than about 0.1% at room temperature. Other ingredients which may be present in such compositions are surface active agents, and thickeners. Such compositions can be prepared by blending finely divided active ingredient into the non-solvent liquid and dispersing the material by application of shear, or by sand-milling or ball-milling the active ingredient with the non-solvent carrier. Preferred such carriers are certain aliphatic hydrocarbons, kerosene, diesel oil, fuel oil, and the like. Surface active agents may be the same as described above for emulsifiable oil solutions. The thickeners can include hydrophobed clays, heavy metal soaps, and the like. Such oil suspensions can consist of 15–60% active ingredient, 0–10% surface active agent, 0–5% thickener, and 25–85% of oil. The oil suspension can be used either by emulsifying the mix into water, or by extending the concentrate with more oil to form dilute sprays.

Granules or pellets are physically stable, particulate compositions containing active material (here, the compounds of Formulae 1 through 3) adhering to or distributed through a basic matrix of a coherent, inert carrier with macroscopic dimensions. In order to aid leaching of active from the granule, a surfactant is usually present.

For the compounds of this invention, the inert carrier is preferably of mineral origin, and the surfactant is a compound known to the art as a wetting agent. Such compounds are listed by J. W. McCutcheon in "Soap and Chemical Specialties," December 1957, and January, February, March, and April 1958.

Suitable carriers are natural clays, some pyrophyllites and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, a solution of the active agent can be sprayed and will be absorbed at concentrations up to 25 weight percent of the total weight. The second suitable types are initially powdered kaolin clays, hydrated attapulgite, or bentonitic clays, either sodium, calcium or magnesium bentonites. These are blended with the active components to give mixtures that are granulated and dried to yield granular material with the active component distributed uniformly throughout the mass. Such granules can also be made with 20 to 30 weight percent active component, but more frequently a concentration of about 10 weight percent is desired for optimum distribution. The granular compositions of this invention are most useful in a size range of 15–30 mesh.

The most suitable wetting agents for the granular compositions of this invention depend upon the type of granule used. When preformed granules are sprayed with active material in liquid form, the most suitable wetting agents are non-ionic, liquid wetters miscible with the solvent. These are compounds more generally known to the art as emulsifiers, and comprise alkyl aryl polyether alcohols, alkyl polyether alcohols, polyoxyethylene sorbitol or sorbitan fatty acid esters, polyethylene glycol fatty esters, fatty alkylol amide condensates and oil soluble petroleum or vegetable oil sulfonates. Such agents will usually comprise from about 0 to 5 weight percent of the total composition.

When the active is first mixed with a powdered carrier and subsequently granulated, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular formulations of this invention comprise about 15 to 30 mesh granules containing from about 5 to 30 weight percent active material, about 0 to 5 weight percent wetting agent, and about 65 to 95 weight percent inert mineral carrier, as these terms are used herein.

A portion of these may be replaced with montmorillonite or attapulgite when more absorptive pellets are desired.

The preferred anhydrous salt sodium sulfate, otherwise known as salt cake, and the preferred wetting and dispersing agents are those listed above for wettable powder formulations. These optional ingredients aid in wetting and break up of the pellets after application.

Thus, the preferred pellet formulation of this invention will contain from 0.5—30% of the active material, from 5–15% of anhydrous sodium sulfate, from 0.5–5.0% of surface active agents and from 50–94% of clay diluent.

Pellets can be made by mixing the finely divided uracils of this invention with suitable clays along with such optional ingredients as anhydrous salts, wetting agents, and dispersing agents. This mixture is moistened with 10–25% by weight of water and is then extruded through a suitable die, under pressure. The extrusions are cut into pre-determined lengths and then dried. These pellets can be granulated, if desired.

FORMULATION WITH OTHER HERBICIDES

The herbicidal uracils of this invention can be combined with other known herbicides to give compositions which have advantages over the individual components.

Among the known herbicides which can be combined with the uracils of Formula 1 are:

*Substituted ureas*

3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea 3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea These ureas can be mixed with the uracils of this invention in proportions of from 1:4 to 4:1, respectively, the preferred ratio being 1:2 to 2:1.

*Substituted triazines*

2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-chloro-4-ethylamino-6-(3-methoxypropylamino)-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-chloro-4,6-bis(isopropylamino)-s-triazine
2-methoxy-4,6-bis(ethylamino-s-triazine
2-methoxy-4-ethylamino-6-isopropylamino-s-triazine
2-methylmercapto-4-(2-methoxyethylamino)-6-isopropylamino-s-triazine These triazines can be mixed with the uracils of this invention in proportions of from 1:4 to 4:1, respectively, the preferred ratio being 1:2 to 2:1.

*Phenols*

Dinitro-o-(sec.-butyl)phenol and its salts
Pentachlorophenol and its salts

These phenols can be mixed with the uracils of this invention in the proportions of 1:10 to 10:1, respectively, the preferred ratio being 1:5 to 5:1.

*Carboxylic acids and derivatives*

The following carboxylic acids and derivatives can be mixed with the uracils of this invention in the listed respective proportions:

A 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
2-methyl-3,6-dichlorobenzoic acid and its salts
2,3-dichloro-6-methylbenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters
2,3,6-trichlorobenzyloxypropanol Mixed in a 1:20 to 8:1 ratio, preferably a 1:8 to 4:1 ratio.

B 2,6-dichlorobenzonitrile

Mixed in a 1:4 to 4:1 ratio, preferably a 1:3 to 3:1 ratio.

C

Trichloroacetic acid and its salts

Mixed in a 1:4 to 25:1 ratio, preferably a 1:2 to 10:1 ratio.

D 2,2-dichloropropionic acid and its salts

Mixed in a 1:4 to 10:1 ratio, preferably a 1:2 to 5:1 ratio.

E

N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester Mixed in a 1:2 to 24:1 ratio, preferably a 1:1 to 12:1 ratio.

F

N-phenylcarbamic acid, isopropyl ester
N-(m-chlorophenyl)carbamic acid, isopropyl ester
N-(m-chlorophenyl)carbamic acid, 4-chloro-2-butynyl ester
N-(3,4-dichlorophenyl)carbamic acid, methyl ester Mixed in a 1:2 to 24:1 ratio, preferably a 1:1 to 12:1 ratio.

G 2,3,6-trichlorophenylacetic acid and its salts

Mixed in a 1:20 to 8:1 ratio, preferably a 1:4 to 4:1 ratio.

H 2-chloro-N,N-diallylacetamide
Maleic hydrazide

Mixed in a 1:2 to 10:1 ratio, preferably a 1:1 to 5:1 ratio.

*Inorganic and mixed inorganic-organic salts*

The following salts can be mixed with the uracils in the listed respective proportions:

A

Calcium propylarsonate
Disodium monomethylarsonate
Octyl-dodecylammoniummethylarsonate
Dimethylarsinic acid Mixed in a 1:4 to 4:1 ratio, preferably a 1:2 to 2:1 ratio.

B

Sodium arsenite

Mixed in a 1:10 to 40:1 ratio, preferably a 1:5 to 25:1 ratio.

C

Lead arsenate
Calcium arsenate

Mixed in a 150:1 to 600:1 ratio, preferably a 100:1 to 400:1 ratio.

D

Sodium tetraborate hydrated, granulated
Sodium metaborate
Sodium pentaborate
Polychlorborate
Unrefined borate ore such as borascu Mixed in a 3:1 to 1500:1 ratio, preferably a 6:1 to 1000:1 ratio.

E

Sodium chlorate

Mixed in a 1:1 to 40:1 ratio, preferably a 2:1 to 20:1 ratio.

F

Ammonium sulfamate

Mixed in a 1:1 to 100:1 ratio, preferably a 1:1 to 50:1 ratio.

G

Ammonium thiocyanate

Mixed in a 1:10 to 20:1 ratio, preferably a 1:5 to 5:1 ratio.

*Other organic herbicides*

These herbicides can be mixed with the uracils in the listed respective proportions:

A 5,6-dihydro-(4A,6A)-dipyrido-(1,2-A,2′,1′-C) pyrazinium dibromide

Mixed in a 1:20 to 16:1 ratio, preferably a 1:5 to 5:1 ratio.

B 3-amino-1,2,4-triazole

Mixed in a 1:20 to 20:1 ratio, preferably a 1:5 to 5:1 ratio.

C 3,6-endoxohexahydrophthalic acid

Mixed in a 1:4 to 20:1 ratio, preferably a 1:2 to 10:1 ratio.

D

Diphenylacetonitrile
N,N-dimethyl-α,α-diphenylacetamide
N,N-di-(n-propyl)-2,6-dinitro-4-trifluoromethylaniline
N,N-di-(n-propyl)-2,6-dinitro-4-methylaniline Mixed in a 1:10 to 30:1 ratio, preferably a 1:5 to 20:1 ratio.

E

O-(2,4-dichlorophenyl)-O-methyl-ispropylphosphoramido-thioate
2,3,5,6-tetrachloroterephthalic acid, dimethyl ester Mixed in a 1:4 to 20:1 ratio, preferably a 1:3 to 15:1 ratio.

F 2,4-dichloro-4′-nitrodiphenyl ether

Mixed in a 1:10 to 30:1 ratio, preferably a 1:5 to 20:1 ratio.

*Other substituted uracils*

The uracils can be mixed with other substituted uracils, in the respective proportions listed below. Methods for the preparation of the listed uracils can be found in copending applications Serial Nos. 217,521, filed August 17, 1962; 233,952, filed October 29, 1962; 221,890, filed September 6, 1962; and 232,311, filed October 22, 1962.

A 3-isopropyl-5-bromo-6-methyluracil
3-isopropyl-5-chloro-6-methyluracil
3-sec.-butyl-5-bromo-6-methyluracil
3-sec.-butyl-5-chloro-6-methyluracil
3-cyclohexyl-5-bromo-6-methyluracil
3-cyclohexyl-5-chloro-6-methyluracil
3-tert.-butyl-5-bromo-6-methyluracil
3-tert.-butyl-5-chloro-6-methyluracil
5-chloro-3-cyclohexylmethyl-6-methyluracil
5-bromo-3-(1-ethylpropyl)-6-methyluracil
5-chloro-3-(1-ethylpropyl)-6-methyluracil
5-bromo-3-(1,3-dimethylbutyl)-6-methyluracil Mixed in a 1:4 to 4:1 ratio, preferably a 1:2 to 2:1 ratio.

B 3-cyclohexyl-6-methyluracil
3-fenchyl-6-ethyluracil
3-cyclohexyl-6-sec.-butyluracil
3-norbornyl-6-methyluracil
3-cyclopentyl-6-methyluracil
3-cyclohexyluracil Mixed in a 1:4 to 4:1 ratio, preferably a 1:2 to 2:1 ratio.

C 3-isopropyl-5-bromouracil
3-sec.-butyl-5-bromouracil
3-sec.-butyl-5-methyluracil
3-cyclohexyl-5-bromouracil
3-cyclohexyl-5-chlorouracil Mixed in a 1:4 to 4:1 ratio, preferably a 1:2 to 2:1 ratio.

D 3-cyclohexyl-5,6-trimethyleneuracil
3-sec.-butyl-5,6-trimethyleneuracil
3-isopropyl-5,6-trimethyleneuracil
3-cyclohexyl-5,6-tetramethyleneuracil
3-isopropyl-5,6-tetramethyleneuracil Mixed in a 1:4 to 4:1 ratio, preferably a 1:2 to 2:1 ratio.

*Examples*

The following examples are presented so that the invention may be more easily practiced.

PREPARATION OF COMPOUNDS

*Example 1.—Preparation of 1,6-dimethyl-3-cyclohexyl-5-bromouracil*

A mixture of 287 parts by weight of 3-cyclohexyl-5-bromo-6-methyluracil, 3500 parts by weight of water, and 130 parts by weight of sodium hydroxide was warmed to 40° C. and stirred until the solids dissolved. To this solution was gradually added 378 parts by weight of dimethyl sulfate. The reaction was essentially complete after stirring at about 40° C. for one hour. The white solid precipitate was filtered off and recrystallized from acetonitrile to give pure 1,6-dimethyl-3-cyclohexyl-5-bromouracil, whose melting point was 178–181° C.

*Example 2.—Preparation of 1-methyl-3-(3,4-dichlorophenyl)-5,6-trimethyleneuracil*

One hundred parts by weight of 3-(3,4-dichlorophenyl)-5,6-trimethyleneuracil, 1000 parts by weight of water, 300 parts by weight of ethanol, and 134 parts by weight of sodium hydroxide were stirred and heated until the solids dissolved. To this solution was gradually added, with stirring, 212 parts by weight of dimethyl sulfate. A white solid separated. When the reaction was complete, the solid was filtered off, dried, and recrystallized from about 1580 parts by weight of ethanol. The dry product melted at 239–241° C.

The following uracils can be prepared in a similar fashion by substituting a listed uracil reactant and an appropriate alkyl sulfate, in equivalent amounts, for the dimethyl-sulfate and the 3-(3,4 - dichlorophenyl) - 5,6-trimethyleneuracil of Example 2, or the 3-cyclohexyl-5-bromo-6-methyluracil of Example 1.

| Uracil reactant | Uracil product |
|---|---|
| 5-bromo-3-cyclohexyl-6-methyluracil | 5-bromo-3-cyclohexyl-1-ethyl-6-methyluracil. |
| 5-chloro-3-cyclohexyl-6-methyluracil | 5-chloro-3-cyclohexyl-1,6-dimethyluracil. |
| 5-chloro-3-isopropyl-6-methyluracil | 5-bromo-1,6-dimethyl-3-isopropyluracil. |
| 3-isopropyl-5,6-trimethyleneuracil | 1-methyl-3-isopropyl-5,6-trimethyleneuracil. |
| 3-cyclohexyl-6-methyluracil | 3-cyclohexyl-1,6-dimethyluracil. |
| 5-chloro-6-methyl-3-isopropyluracil | 5-chloro-1,6-dimethyl-5-isopropyluracil. |
| 3-cyclohexyl-5-hydroxymethyl-6-methyluracil | 3-cyclohexyl-1,6-dimethyl-5-hydroxymethyluracil. |
| 3-cyclohexyl-5-iodo-6-methyluracil | 3-cyclohexyl-1,6-dimethyl-5-iodouracil. |
| 3-cyclohexyl-5-fluoro-6-methyluracil | 3-cyclohexyl-1,6-dimethyl-5-fluorouracil. |
| 3-cyclohexyl-6-chlorouracil | 3-cyclohexyl-6-chloro-1-methyluracil. |
| 3-cyclohexyl-5,6-dichlorouracil | 3-cyclohexyl-5,6-dichloro-1-methyluracil. |
| 6-chloro-5-methyl-3-isopropyluracil | 6-chloro-1,5-dimethyl-3-isopropyluracil. |
| 6-amyl-5-methoxymethyl-3-isopropyluracil | 6-amyl-5-methoxymethyl-1-methyl-3-isopropyluracil. |
| 6-bromo-5-methyl-3-isopropyluracil | 6-bromo-1,5-dimethyl-3-isopropyluracil. |
| 5-bromo-3-sec.-butyl-6-methoxyuracil | 5-bromo-3-sec.-butyl-6-methoxy-1-methyluracil. |
| 6-n-amyloxy-3-cyclohexyluracil | 6-n-amyloxy-3-cyclohexyl-1-methyluracil. |
| 5-chloro-6-methyl-3-phenyluracil | 5-chloro-1,6-dimethyl-3-phenyluracil. |
| 3-tert.-butyl-5,6-trimethyleneuracil | 1-methyl-3-tert.-butyl-5,6-trimethyleneuracil. |
| 5-bromo-3-cyclohexyl-6-methyluracil | 5-bromo-3-cyclohexyl-1,6-dimethyluracil. |
| 3-cyclohexyl-6-methyluracil | 3-cyclohexyl-1,6-dimethyluracil. |
| 3-isopropyl-5,6-trimethyleneuracil | 1-methyl-3-isopropyl-5,6-trimethyleneuracil. |
| 5-chloro-3-sec.-butyl-6-methyluracil | 5-chloro-3-sec.-butyl-1,6-dimethyluracil. |
| 5-bromo-6-methyl-3-phenyluracil | 5-bromo-1,6-dimethyl-3-phenyluracil. |
| 3-cyclohexyl-5-hydroxymethyl-6-methyluracil | 3-cyclohexyl-1,6-dimethyl-5-hydroxymethyluracil. |
| 5-chloro-3-(1,3-dimethylbutyl)-6-methyluracil | 5-chloro-3-(1,3-dimethylbutyl)-1,6-dimethyluracil. |
| 5-bromo-6-methyl-3-isopropyluracil | 1-amyl-5-bromo-3-isopropyl-6-methyluracil. |
| 5-bromo-3-cyclohexylmethyl-6-methyluracil | 5-bromo-3-cyclohexylmethyl-1,6-dimethyluracil. |
| 5-chloro-3-cyclohexylmethyl-6-methyluracil | 5-chloro-3-cyclohexylmethyl-1,6-dimethyluracil. |
| 5-chloro-3-tert.-butyl-6-methyluracil | 5-chloro-3-tert.-butyl-1,6-dimethyluracil. |
| 5-bromo-3-(1,3-dimethylbutyl)-6-methyluracil | 5-bromo-3-(1,3-dimethylbutyl)-1,6-dimethyluracil. |
| 3-(3-amyl)-5-bromo-6-methyluracil | 3-(3-amyl)-5-bromo-1,6-dimethyluracil. |
| 3-(3-amyl)-5-chloro-6-methyluracil | 3-(3-amyl)-5-chloro-1,6-dimethyluracil. |
| 5-chloro-3-cyclohexyl-6-methyluracil | 5-chloro-3-cyclohexyl-1-ethyl-6-methyluracil. |
| 5-bromo-3-cyclopentenyl-6-methyluracil | 5-bromo-3-cyclopentenyl-1-ethyl-6-methyluracil. |
| 5-bromo-3-cycloheptyl-6-methyluracil | 5-bromo-3-cycloheptyl-1-ethyl-6-methyluracil. |
| 5-chloro-3-cyclopentyl-6-methyluracil | 5-chloro-3-cyclopentyl-6-methyl-1-n-propyluracil. |
| 5-bromo-3-sec.-butyl-6-methyluracil | 5-bromo-3-sec.-butyl-1,6-dimethyluracil. |
| 3-sec.-amyl-5-bromo-6-methyluracil | 3-sec.-amyl-5-bromo-1,6-dimethyluracil. |
| 5-bromo-3-tert.-butyl-6-methyluracil | 5-bromo-3-tert.-butyl-1,6-dimethyluracil. |
| 3-cyclohexyl-5,6-dimethyluracil | 3-cyclohexyl-1,5,6-trimethyluracil. |
| 3-cyclopentenyl-5,6-dimethyluracil | 3-cyclopentenyl-5,6-dimethyl-1-n-propyluracil. |
| 3-cyclohexenyl-5-ethyl-6-methyluracil | 3-cyclohexenyl-1,6-dimethyl-5-ethyluracil. |
| 3-tert.-butyl-5,6-dimethyluracil | 3-tert.-butyl-5,6-dimethyl-1-ethyluracil. |
| 3-sec.-butyl-5,6-trimethyleneuracil | 3-sec.-butyl-1-ethyl-5,6-trimethyleneuracil. |
| 3-cyclohexyl-5,6-trimethyleneuracilg | 3-cyclohexyl-1-methyl-5,6-trimethyleneuracil. |
| 3-cyclohexyl-5,6-tetramethyleneuracil | 3-cyclohexyl-1-methyl-5,6-tetramethyleneuracil. |
| 3-ethyl-5,6-tetramethyleneuracil | 3-ethyl-1-methyl-5,6-tetramethyleneuracil. |
| 3-phenyl-5,6-trimethyleneuracil | 3-phenyl-1-n-propyl-5,6-trimethyleneuracil. |
| 5-bromo-6-methyl-3-sec.-octyluracil | 5-bromo-1,6-dimethyl-3-sec.-octyluracil. |
| 3-sec.-hexyl-5-hydroxymethyl-6-methyluracil | 1-ethyl-3-sec.-hexyl-5-hydroxymethyl-6-methyluracil. |
| 5-bromo-3-cyclohexyl-6-ethyluracil | 5-bromo-3-cyclohexyl-6-ethyl-1-methyluracil. |
| 3-cyclohexyl-6-methyluracil | 3-cyclohexyl-1-ethyl-6-methyluracil. |
| 3-cyclopentyl-6-methyluracil | 3-cyclopentyl-6-methyl-1-n-propyluracil. |
| 3-cycloheptyl-6-methyluracil | 3-cycloheptyl-1,6-dimethyluracil. |
| 3-cyclohexyluracil | 3-cyclohexyl-1-methyluracil. |

*Example 3.—Preparation of 1-acetyl-3-n-butyl-5-bromo-6-methyluracil*

Ketene in nitrogen as a carrier gas was bubbled into 104 parts of 3-n-butyl-5-bromo-6-methyluracil in 1000 parts of acetone at room temperature. A mildly exothermic reaction took place, after which the resulting solution was concentrated to an oil at room temperature and treated with cold water to give a solid which, after dissolving in ether and washing with 5% sodium hydroxide and with water, drying and recrystallizing from hexane, gave pure 1-acetyl-3-n-butyl-5-bromo-6-methyluracil melting at 54.5 to 55° C.

The following 1-acetyluracils can be similarly prepared by reacting an equivalent amount of the appropriate substituted uracil and ketene:

1-acetyl-5-bromo-3-cyclohexylmethyl-6-methyluracil
1-acetyl-5-bromo-3-(1,3-dimethylbutyl)-6-methyluracil
1-acetyl-3-cyclohexyl-5,6-trimethyleneuracil
1-acetyl-5-chloro-3-tert.butyl-6-methyluracil
1-acetyl-5-chloro-3-sec.-butyl-6-methyluracil
1-acetyl-5-chloro-6-methyl-3-phenyluracil
1-acetyl-3-isopropyl-5-bromo-6-methyluracil
1-acetyl-5-chloro-3-cyclohexylmethyl-6-methyluracil
1-acetyl-5-bromo-3-sec.-butyl-6-methyluracil
1-acetyl-5-bromo-3-tert.butyl-6-methyluracil
1-acetyl-5-chloro-3-cyclohexyl-6-methyluracil
1-acetyl-5-bromo-6-methyl-3-phenyluracil
1-acetyl-6-bromomethyl-3-ethyl-5-bromouracil
1-acetyl-5-bromo-3-(1-ethylpropyl)-6-methyluracil
1-acetyl-3-(3-amyl)-5-chloro-6-methyluracil

*Example 4.—Preparation of 1,3-diisopropyl-5-bromo-6-methyluracil*

A suspension of the sodium derivative of 3-isopropyl-5-bromo-6-methyluracil in dioxane was prepared, under anhydrous conditions and in an atmosphere of nitrogen, by the gradual addition of 48 parts by weight of sodium hydride (55% active in mineral oil) to a stirred solution of 247 parts by weight of 3-isopropyl-5-bromo-6-methyluracil in 1000 parts by weight of dioxane. Formation of the sodium derivative was followed by the evolution of hydrogen.

When hydrogen ceased to be evolved, the sodium salt suspension was heated to reflux and stirred as 123 parts by weight of isopropyl bromide are gradually added. Refluxing was continued until sodium bromide ceased to form.

After cooling, the mixture was cautiously diluted with water to precipitate the product, which was filtered, dried, washed with cold heptane to remove mineral oil, and dried. The resulting essentially pure 1,3-diisopropyl-5-bromo-6-methyluracil can be used as such or recrystallized from a suitable solvent if higher purity is desired.

The following uracils can be prepared in a similar fashion by substituting equivalent amounts of the indicated alkyl halide and uracil for the isopropyl bromide and 3-isopropyl-5-bromo-6-methyluracil:

| Uracil reactant | Alkyl halide | Uracil product |
|---|---|---|
| 5-bromo-3-cyclohexyl-6-methyluracil | Chloromethyl ether | 5-bromo-3-cyclohexyl-6-methyl-1-methoxy methyluracil. |
| 5-bromo-3-sec.-butyl-6-methyluracil | Isopropyl bromide | 5-bromo-3-sec.-butyl-6-methyl-1-isopropyluracil. |
| 5-chloro-3-cyclohexyl-6-methyluracil | 4-bromobutyronitrile | 5-chloro-1-(3-cyanopropyl)-3-cyclohexyl-6-methyluracil. |
| 3-isopropyl-5,6-dimethyluracil | Tert.-amyl bromide | Tert.-amyl-5,6-dimethyl-3-isopropyluracil. |
| 3-norbornenyl-5,6-dimethyluracil | Allyl chloride | 1-(allyl)-5,6-dimethyl-3-norbornenyluracil. |
| 3-ethoxycarbonylmethyl-5-bromo-6-methyluracil | Dichlorobutene | 1-(4-chlorobutene-2)-5-bromo-3-ethoxycarbonylmethyl-6-methyluracil. |
| 3-cyclohexyl-6-methyluracil | Propargyl bromide | 3-cyclohexyl-6-methyl-1-propynyluracil. |
| 3-cyclohexylmethyl-5-methoxymethyl-6-methyluracil | 2,5-dibromopentane | 3-cyclohexylmethyl-1-1-(4-bromopentyl)-5-methoxymethyl-6-methyluracil. |
| 3-(1,1-dimethylbutyl)-5-bromo-6-methyluracil | p-Chlorobenzylsulfenylchloride | 5-bromo-1-(p-chlorobenzylthio)-3-(1,1-dimethylbutyl)-6-methyluracil. |
| 3-(2-isopropyl-5-methylhexyl)-5-methyluracil | 3-bromopropionitrile | 1-(2-cyanoethyl)-3-(2-isopropyl-5-methylhexyl)-5-methyluracil. |
| 3-cyclohexyl-5-bromo-6-methyluracil | α-Bromomethylacetate | 5-bromo-3-cyclohexyl-6-methyl-1-uracil acetic acid, methyl ester. |
| 3-isopropyl-5-butyl-6-methyluracil | α-Bromo valeric acid, methyl ester | 5-butyl-6-methyl-3-isopropyl-1-uracil (1-propylacetic) acid, methyl ester. |
| 3-norbornylmethyl-5-amyloxymethyl-6-methyluracil | α-Bromoacetic acid | 5-amyloxymethyl-6-methyl-3-norbornylmethyl-1-uracil acetic acid. |
| 5-(1-ethyl-2-hydroxybutyl)-3-isopropyl-6-methyluracil | Ethyl iodide | 5-(1-ethyl-2-hydroxybutyl)-1-ethyl-6-methyl-3-isopropyluracil. |
| 3-allyl-5,6-dimethyluracil | Chloroacetonitrile | 3-allyl-5,6-dimethyl-1-cyanomethyluracil. |
| 3,5-diallyl-6-methyluracil | Methyl iodide | 3,5-diallyl-1,6-dimethyluracil. |

*Example 5.—Preparation of 1-trichloromethylthio-3-isopropyl-5-bromo-6-methyluracil*

A solution of 41 parts by weight of sodium hydroxide, 600 parts by weight of water, 470 parts by weight of isopropyl alcohol, and 247 parts by weight of 3-isopropyl-5-bromo-6-methyluracil was stirred and cooled to 6° C. This solution was rapidly stirred and 186 parts by weight of trichloromethanesulfenyl chloride were added. A white solid formed almost immediately.

After the solution had been stirred for 3–5 minutes, crude 1-trichloromethylthio-3-isopropyl-5-bromo-6-methyluracil was filtered off, washed with water, dried, and recrystallized twice from heptane. It was found to have a melting point of 96–100° C. After recrystallization from ethanol, its melting point was 103–105° C.

*Example 6.—Preparation of 1-trichloromethylthio-3-cyclohexyl-6-methyluracil*

A mixture of 104 parts by weight of 3-cyclohexyl-6-methyluracil, 235 parts by weight of isopropyl alcohol, 300 parts by weight of water, and 20.5 parts by weight of sodium hydroxide was stirred until the solids were dissolved. The solution was then cooled to 10° C. and 93 parts by weight of trichloromethanesulfenyl chloride were added.

The 3-cyclohexyl-6-methyl-1-(trichloromethylthio)-uracil precipitated almost immediately. It was filtered, dried, and recrystallized from a mixture of ethanol and water and had a melting point of 129–131° C.

The following uracils can be prepared in a similar fashion by substituting an equivalent amount of the indicated uracil and the appropriate sulfenyl chloride for the substituted uracils and trichloromethanesulfenyl chloride of Examples 5 and 6:

| Uracil reactant | Uracil product |
|---|---|
| 5-chloro-3-ethyl-6-methyluracil | 5-chloro-3-ethyl-6-methyl-1-(trichloromethylthio)uracil. |
| 5-bromo-3-isobutyl-6-methyluracil | 5-bromo-3-isobutyl-6-methyl-1-(trichloromethylthio)uracil. |
| 5-bromo-3-sec.-butyl-6-methyluracil | 5-bromo-3-sec.-butyl-6-methyl-1-(trichloromethylthio)uracil. |
| 5-bromo-3-tert.-butyl-6-methyluracil | 5-bromo-3-tert.-butyl-6-methyl-1-(trichloromethylthio)uracil. |
| 5-bromo-3-sec.-hexyl-6-methyluracil | 5-bromo-3-sec.-hexyl-6-methyl-1-(trichloromethylthio)uracil. |
| 5-bromo-3-cyclohexyl-6-methyluracil | 5-bromo-3-cyclohexyl-6-methyl-1-(trichloromethylthio)uracil. |
| 5-chloro-3-cyclopentyl-6-methyluracil | 5-chloro-3-cyclopentyl-6-methyl-1-(trichloromethylthio)uracil. |
| 5-bromo-3-cycloheptenyl-6-methyluracil | 5-bromo-3-cycloheptenyl-6-methyl-1-(trichloromethylthio)uracil. |
| 5-bromo-3-cyclooctyl-6-methyluracil | 5-bromo-3-cyclooctyl-6-methyl-1-(trichloromethylthio)uracil. |
| 5-chloro-3-sec.-butyl-6-ethyluracil | 5-chloro-3-sec.-butyl-6-ethyl-1-(trichloromethylthio)uracil. |
| 5-chloro-6-methyl-3-isopropyluracil | 5-chloro-6-methyl-3-isopropyl-1-(trichloromethylthio)uracil. |
| 5-chloro-3-cyclohexylmethyl-6-methyluracil | 5-chloro-3-cyclohexylmethyl-6-methyl-1-trichloromethylthiouracil. |
| 5,6-dimethyl-3-cyclohexyluracil | 5,6-dimethyl-3-cyclohexyl-1-(trichloromethylthio)uracil. |
| 5,6-dimethyl-3-sec.-butyluracil | 5,6-dimethyl-3-sec.-butyl-1-(trichloromethylthio)uracil. |
| 3-isopropyl-5,6-trimethyleneuracil | 3-isopropyl-5,6-trimethylene-1-(trichloromethylthio)uracil. |
| 3-cyclohexyl-5,6-trimethyleneuracil | 3-cyclohexyl-1-trichloromethylthio-5,6-trimethyleneuracil. |
| 3-tert.-butyl-5,6-tetramethyleneuracil | 3-tert.-butyl-5,6-tetramethylene-1-(trichloromethylthio)uracil. |
| 3-(3-amyl)-5-chloro-6-methyluracil | 3-(3-amyl)-5-chloro-6-methyl-1-trichloromethylthiouracil. |
| 5-bromo-6-ethyl-3-isopropyluracil | 5-bromo-6-ethyl-3-isopropyl-1-(10-chlorodecylthio)uracil. |
| 6-methyl-5-nitro-3-isopropyluracil | 6-methyl-5-nitro-3-isopropyl-1-(dodecylthio)uracil. |
| 5-chloro-3-(1,3-dimethylbutyl)-6-methyluracil | 5-chloro-3-(1,3-dimethylbutyl)-6-methyl-1-trichloromethylthiouracil. |
| 3-norbornyl-5-bromo-6-methyluracil | 3-norbornyl-5-bromo-6-methyl-1-(trichloromethylthio)uracil. |
| 3-chloronorbornyl-5-chloro-6-methyluracil | 3-chloronorbornyl-5-chloro-6-methyl-1-(trichloromethylthio)uracil. |
| 3-phenyl-5-bromo-6-methyluracil | 3-phenyl-5-bromo-6-methyl-1-(trichloromethylthio)uracil. |
| 3-decalinyl-5-bromo-6-methyluracil | 3-decalinyl-5-bromo-6-methyl-1-(trichloromethylthio)uracil. |
| 5-chloro-6-methyl-3-phenyluracil | 5-chloro-6-methyl-3-phenyl-1-trichloromethylthiouracil. |
| 3-phenyl-5-methyluracil | 3-phenyl-5-methyl-1-(trichloromethylthio)uracil. |
| 3-(3a,4,5,6,7,7a-hexahydro-4,7-methano-5-idenyl)-5,6-dimethyluracil | 3-(3a,4,5,6,7,7a-hexahydro-4,7-methano-5-indenyl)-5,6-dimethyl-1-(trichloromethylthio)uracil. |
| 3-isopropyl-5-nitro-6-methyluracil | 3-isopropyl-5-nitro-6-methyl-1-(trichloromethylthio)uracil. |
| 5-chloro-3-sec.butyl-6-methyluracil | 5-chloro-3-sec.butyl-6-methyl-1-(trichloromethylthio)uracil. |
| 5-chloro-3-tert.butyl-6-methyluracil | 5-chloro-3-tert.butyl-6-methyl-1-(trichloromethylthio)uracil. |
| 5-bromo-3-(1,3-dimethylbutyl)-6-methyluracil | 5-bromo-3-(1,3-dimethylbutyl)-6-methyl-1-(trichloromethylthio)uracil. |
| 3-(3-amyl)-5-bromo-6-methyluracil | 3-(3-amyl)-5-bromo-6-methyl-1-(trichloromethylthio)uracil. |
| 5-bromo-3-cyclohexylmethyl-6-methyluracil | 5-bromo-3-cyclohexylmethyl-6-methyl-1-(trichloromethylthio)uracil. |

*Example 7.—Preparation of 1-(2,4-dinitrophenylthio)-3-sec.-butyl-5-bromo-6-methyluracil*

A suspension of the sodium derivative of 3-sec.-butyl-5-bromo-6-methyluracil in dioxane was prepared under anhydrous conditions by the gradual addition of 48 parts by weight of sodium hydride (55% active in mineral oil) to a stirred solution of 261 parts by weight of 3-sec.-butyl-5-bromo-6-methyluracil in 1000 parts by weight of dioxane under an atmosphere of nitrogen. Formation of the sodium derivative was followed by the evolution of hydrogen.

When hydrogen evolution ceased, the sodium salt suspension was heated to reflux and stirred as 235 parts by weight of 2,4-dinitrobenzenesulfenyl chloride were gradually added. Refluxing was continued until sodium chloride ceased to form.

After cooling, the solution was cautiously diluted with water to precipitate the product, which was then filtered, dried, washed with cold heptane to remove the mineral oil, and again dried.

The following uracils can be prepared by substituting equivalent weights of the listed reactants for those used above:

water to precipitate the product, which was then filtered, washed with cold pentane to remove the mineral oil, and dried.

The following compounds can be similarly prepared by substituting equivalent amounts of the corresponding

| Uracil starting reactant | Reactant | Uracil product |
|---|---|---|
| 5-bromo-3-isopropyl-6-methyluracil | Benzenesulfenyl chloride | 5-bromo-3-isopropyl-6-methyl-1-(phenylthio)uracil. |
| 3-sec.-butyl-5-chloro-6-methyluracil | (p-Chlorobenzene)sulfenyl chloride | 3-sec.-butyl-5-chloro-1-(p-chlorophenylthio)-6-methyluracil. |
| 5-bromo-3-tert.-butyl-6-methyluracil | (2,4-dichlorobenzene)sulfenyl chloride | 5-bromo-3-tert.-butyl-1-(2,4-dichlorophenylthio)-6-methyluracil. |
| 5-bromo-3-isohexyl-6-methyluracil | Benzenesulfenyl chloride | 5-bromo-3-isohexyl-6-methyl-1-(phenylthio)uracil. |
| 5-bromo-6-methyl-3-sec.-octyluracil | (p-Nitrobenzene)sulfenyl chloride | 5-bromo-6-methyl-1-(p-nitrophenylthio)-3-sec.-octyluracil. |
| 5-chloro-6-methyl-3-isopropyluracil | (p-toluene)sulfenyl chloride | 5-chloro-6-methyl-3-isopropyl-1-(p-tolylthio)uracil. |
| 5-bromo-3-sec.-butyl-6-ethyluracil | (2,4-dinitrobenzene)sulfenyl chloride | 5-bromo-3-sec.-butyl-1-(2,4-dinitrophenylthio)-6-ethyluracil. |
| 5-bromo-6-methyl-3-phenyluracil | Benzenesulfenyl chloride | 5-bromo-6-methyl-3-phenyl-1-(phenylthio)uracil. |
| 5,6-dimethyl-3-isopropyluracil | (2,4-dichlorobenzene)sulfenyl chloride | 5,6-dimethyl-1-(2,4-dichlorophenylthio)-3-isopropyluracil. |
| 3-cyclohexyl-5,6-dimethyluracil | (p-Chlorobenzene)sulfenyl chloride | 3-cyclohexyl-1-(p-chlorophenylthio)-5,6-dimethyluracil. |
| 3-cyclopentyl-5,6-dimethyluracil | (p-Toluene)sulfenyl chloride | 3-cyclopentyl-5,6-dimethyl-1-(p-tolylthio)uracil. |
| 5-bromo-3-ethyl-6-methyluracil | Benzenesulfenyl chloride | 5-bromo-3-ethyl-6-methyl-1-(phenylthio)uracil. |
| 5-chloro-3-cyclooctenyluracil | (p-Nitrobenzene)sulfenyl chloride | 5-chloro-3-cyclooctenyl-1-(p-nitrophenylthio)uracil. |
| 3-sec.-amyl-5-bromo-6-methyluracil | Benzenesulfenyl chloride | 3-sec.-amyl-5-bromo-6-methyl-1-(phenylthio)uracil. |
| 3-isopropyl-5,6-tetramethyleneuracil | do | 1-phenylthio-3-isopropyl-5,6-tetramethyleneuracil. |
| 3-cyclohexyl-5,6-tetramethyleneuracil | (p-Chlorobenzene)sulfenyl chloride | 1-(p-chlorophenylthio)-3-cyclohexyl-5,6-tetramethyleneuracil. |
| 5-bromo-3-cyclohexyl-6-methyluracil | (2,4-dinitrobenzene)sulfenyl chloride | 5-bromo-3-cyclohexyl-1-(2,4-dinitrophenylthio)-6-methyluracil. |
| 5-chloro-3-cyclopentenyl-6-methyluracil | (p-Chlorobenzene)sulfenyl chloride | 5-chloro-1-(p-chlorophenylthio)-3-cyclopentenyl-6-methyluracil. |
| 5-bromo-3-cyclooctenyl-6-methyluracil | Benzenesulfenyl chloride | 5-bromo-3-cyclooctenyl-6-methyl-1-(phenylthio)uracil. |
| 3-cyclohexyluracil | do | 3-cyclohexyl-1-(phenylthio)uracil. |
| 5-bromo-3-cyclohexylmethyl-6-methyluracil | do | 1-benzylthio-5-bromo-3-cyclohexylmethyl-6-methyluracil. |
| 5-hydroxymethyl-3-(5,6,7,8-tetrahydronaphthyl)uracil | Tert.-butylsulfenyl chloride | 1-tert.-butylthio-5-hydroxymethyl-3-(5,6,7,8-tetrahydronaphthyl)uracil. |
| 5,6-dimethyl-3-(4-isopropylcyclohexyl)uracil | Methanesulfenyl chloride | 5,6-dimethyl-3-(4-isopropylcyclohexyl)-1-(methylthio)uracil. |
| 5-bromo-3-isopropyl-6-methyluracil | Crotyl chloride | 5-bromo-1-(2-buten-1-yl)-3-isopropyl-6-methyluracil. |
| 5-bromo-3-isopropyl-6-methyluracil | Thiocarbamyl chloride | 5-bromo-3-isopropyl-6-methyl-1-thiocarbamyluracil. | uracil and acyl halide starting reactants for the 3-(n-amyl)-5-bromo-6-methyluracil and benzoyl chloride:

| Uracil reactant | Acylating agent | Uracil product |
|---|---|---|
| 3-(2-buten-3-yl)-5,6-dimethyluracil | (2,6-dichlorophenyl) acetyl chloride | 3-(2-buten-3-yl)-1-(2,6-dichlorophenylacetyl)-5,6-dimethyluracil. |
| 5-hydroxymethyl-6-methyl-3-(1,2,3,4-tetrahydronaphthyl)uracil | Phenylacetyl chloride | 5-hydroxymethyl-6-methyl-1-phenylacetyl-3-(1,2,3,4-tetrahydronaphthyl)uracil. |
| 5-chloro-3-tert.-butyl-6-methyluracil | Benzoyl chloride | 1-benzoyl-5-chloro-3-tert.-butyl-6-methyluracil. |
| 5-bromo-3-cyclohexyl-6-methyluracil | O,O-diethylphosphoryl chloride | 5-bromo-3-cyclohexyl-6-methyl-1-uracil phosphonic acid, diethyl ester. |
| 5-bromo-3-cyclohexyl-6-methyluracil | 2,3,6-trichlorobenzoyl chloride | 5-bromo-3-cyclohexyl-6-methyl-1-(2,3,6-trichlorobenzoyl)uracil. |
| 3-cyclohexyl-6-methyluracil | do | 3-cyclohexyl-6-methyl-1-(2,3,6-trichlorobenzoyl)uracil. |
| 3-cyclohexyl-6-methyluracil | Benzoyl chloride | 1-benzoyl-3-cyclohexyl-6-methyluracil. |
| 3-isopropyl-5,6-trimethyleneuracil | Propionyl chloride | 1-propionyl-3-isopropyl-5,6-trimethyleneuracil. |
| 3-cyclohexyl-5,6-trimethyleneuracil | Benzoyl chloride | 1-benzoyl-3-cyclohexyl-5,6-trimethyleneuracil. |
| 3-cyclohexyl-5,6-tetramethyleneuracil | O,O-dipropylphosphoryl chloride | 3-cyclohexyl-5,6-tetramethylene-1-uracil phosphonic acid, dipropyl ester. |
| 5-bromo-3-sec.-octyl-6-methyluracil | Benzoyl chloride | 1-benzoyl-5-bromo-3-sec.-octyl-6-methyluracil. |
| 5-bromo-3-cyclohexyluracil | Propionyl chloride | 5-bromo-3-cyclohexyl-1-propionyluracil. |
| 5-bromo-3-isopropyl-6-methyluracil | Dimethylcarbamyl chloride | 5-bromo-1-dimethylcarbamyl-3-isopropyl-6-methyluracil. |
| 5-chloro-3-cyclohexyl-6-methyluracil | Diethylcarbamyl chloride | 5-chloro-3-cyclohexyl-1-diethylcarbamyl-6-methyluracil. |
| 5-bromo-3-sec.-butyl-6-methyluracil | Diphenylcarbamyl chloride | 5-bromo-3-sec.-butyl-1-diphenylcarbamyl-6-methyluracil. |
| 5-bromo-3-isopropyl-6-methyluracil | (2,3,6-trichlorophenyl)-acetyl chloride | 5-bromo-3-isopropyl-6-methyl-1-(2,3,6,-trichlorophenylacetyl)uracil. |
| 5-nitro-3-sec.-butyl-6-methyluracil | O,O-dimethylphosphoryl chloride | 5-nitro-3-sec.-butyl-6-methyl-1-uracil phosphonic acid, dimethyl ester. |
| 5-bromo-3-sec.-butyl-6-methyluracil | O,O-diethylthionophosphoryl chloride | 5-bromo-3-sec.-butyl-6-methyluracil-1-diethylphosphonic acid, diethyl ester. |

*Example 8.—Preparation of 1-benzoyl-3-(n-amyl)-5-bromo-6-methyluracil*

To a stirred anhydrous solution of 275 parts by weight of 3-(n-amyl)-5-bromo-6-methyluracil in 1000 parts by weight of dioxane, under a nitrogen blanket, were gradually added 48 parts by weight of sodium hydride (55% active in mineral oil). The formation of this sodium derivative was followed by the evolution of hydrogen.

When hydrogen ceased to be evolved, the sodium salt suspension was heated to reflux and stirred as 140 parts by weight of benzoyl chloride were gradually added. Refluxing was continued until the reaction was complete.

After cooling, the solution was cautiously diluted with

*Example 9.—Preparation of 1-(N-phenylcarbamyl)-3-isopropyl-5-bromo-6-methyluracil*

A mixture of 247 parts by weight of 3-isopropyl-5-bromo-6-methyluracil, 1500 parts by weight of dioxane, and 131 parts by weight of phenyl isocyanate was stirred at reflux for twenty-four hours under anhydrous conditions. This solution was then chilled and the solid derivative that separated was filtered and suspended in a 5% sodium hydroxide solution to remove unreacted uracil.

The solid, essentially pure 1-(N-phenylcarbamyl)-3-isopropyl-5-bromo-6-methyluracil which remained was filtered, washed free of alkali and dried.

The following uracils can be prepared by substituting equivalent amounts of the listed reactants for 3-isopropyl-5-bromo-6-methyluracil and phenyl isocyanate:

| Uracil reactant | Isocyanate reactant | Uracil product |
|---|---|---|
| 5-bromo-3-isopropyl-6-methyl | CH₃NCO | 5-bromo-1-methylcarbamyl-3-isopropyl-6-methyluracil. |
| 5-bromo-3-sec.-butyl-6-methyl | CH₃NCO | 5-bromo-3-sec.-butyl-1-methylcarbamyl-6-methyluracil. |
| 5-chloro-3-sec.-butyl-6-methyl | CH₃NCS | 5-chloro-3-sec.-butyl-1-methylthiocarbamyl-6-methyluracil. |
| 5-bromo-3-cyclohexyl | CH₃NCO | 5-bromo-3-cyclohexyl-1-methylcarbamyluracil. |
| 3-cyclohexyl-6-methyl | CH₃NCO | 3-cyclohexyl-1-methylcarbamyl-6-methyluracil. |
| 3-cyclohexyl-5,6-trimethylene | CH₃NCO | 3-cyclohexyl-1-methylcarbamyl-5,6-trimethyleneuracil. |
| 3-isopropyl-5,6-dimethyl | CH₃NCO | 3-isopropyl-1-methylcarbamyl-5,6-dimethyluracil. |
| 3-isopropyl-5-bromo-6-methyl | EtNCO | 3-isopropyl-1-ethylcarbamyl-5-bromo-6-methyluracil. |
| 3-tert.-butyl-5-bromo-6-methyl | n-C₄H₉NCO | 3-tert.-butyl-1-n-butylcarbamyl-5-bromo-6-methyluracil. |
| 3-ethyl-5-bromo-6-methyl | φNCO | 3-ethyl-1-carbanilyl-5-bromo-6-methyluracil. |
| 3-n-butyl-5-chloro-6-methyl | φNCS | 3-n-butyl-1-thiocarbanilyl-5-chloro-6-methyluracil. |
| 3-isopropyl-5-bromo-6-methyl | 3,4-dichlorophenyl isocyanate | 3-isopropyl-1-(3,4-dichlorocarbanilyl)-5-bromo-6-methyluracil. |
| 3-isopropyl-5-nitro-6-methyl | C₃H₅NCS | 3-isopropyl-1-allylthiocarbamyl-5-nitro-6-methyluracil. |
| 3-isopropyl-5-methoxy-6-methyl | CH₃NCO | 3-isopropyl-1-methylcarbamyl-5-methoxy-6-methyluracil. |
| 3-cyclopropyl-5-methyl | HNCO | 1-carbamyl-3-cyclopropyl-5-methyluracil. |

*Example 10.—Preparation of 1-hydroxymethyl-3-isopropyl-5,6-dimethyluracil*

Into a rocker-type pressure vessel were placed 247 parts by weight of 3-isopropyl-5,6-dimethyluracil, 500 parts by weight of water, 82.5 parts by weight of a 40% aqueous formaldehyde solution, and 15 parts by weight of barium hydroxide. The mixture was rocked and heated at 175–200° C. for 3–5 hours.

The vessel was then cooled, vented, and the contents were neutralized with acetic acid. After cooling, the product was separated, washed with cold water, and dried.

If desired, the product can be recrystallized from an aqueous alcohol solution.

The following uracils can be prepared in a similar fashion by substituting equivalent amounts of the listed uracil reactants for the 3-isopropyl-5,6-dimethyluracil:

| Uracil reactant | Uracil product |
|---|---|
| 3-cyclohexyl-5,6-dimethyluracil | 3-cyclohexyl-5,6-dimethyl-1-hydroxy-methyluracil. |
| 3-norbornyl-5,6-dimethyluracil | 3-norbornyl-5,6-dimethyl-1-hydroxy-methyluracil. |
| 3-cyclohexyl-5,6-trimethyleneuracil | 3-cyclohexyl-1-hydroxymethyl-5,6-trimethyleneuracil. |
| 3-cyclohexyl-5,6-tetramethyleneuracil | 3-cyclohexyl-1-hydroxymethyl-5,6-tetramethyleneuracil. |
| 3-cyclohexyl-5,6-pentamethyleneuracil | 3-cyclohexyl-1-hydroxymethyl-5,6-pentamethyleneuracil. |
| 3-sec.-amyl-5-ethyl-6-methyluracil | 3-sec.-amyl-5-ethyl-1-hydroxy-methyl-6-methyluracil. |

The 1-hydroxymethyl products above react easily at room temperature with concentrated hydrochloric acid and conc. hydrobromic acid to give the corresponding 1-chloromethyl and 1-bromomethyl analogs.

*Example 11.—Preparation of 3-cyclohexyl-5-bromo-6-methyl-1-uracil propionic acid*

To an anhydrous solution of 287 parts by weight of 3-cyclohexyl-5-bromo-6-methyluracil in 2000 parts by weight of dioxane in an atmosphere of nitrogen were gradually added, with stirring, 48 parts by weight of sodium hydride (55% active in mineral oil). The formation of this sodium derivative was followed by the evolution of hydrogen.

When hydrogen evolution ceased, the uracil sodium salt suspension was again stirred and 79 parts by weight of β-propiolactone were gradually added. The temperature was maintained at about 25° C. until the reaction ceased to be exothermic. The solution was then refluxed for a short time to ensure complete reaction.

After cooling, the solution was diluted with 8000 parts by weight of water acidified with carbon dioxide and filtered to remove unreacted uracil. The filtrate was then acidified with hydrochloric acid to a pH of 2 and chilled. The resulting precipitate was then filtered and dried.

The following uracils can be similarly prepared by substituting equivalent amounts of the listed uracil reactants for the 3-cyclohexyl-5-bromo-6-methyluracil.

This reaction can also be run effectively in aqueous sodium hydroxide solution instead of in dioxane with sodium hydride. Other lactones such as butyrolactone, valerolactone can be used similarly.

| Uracil reactant | Uracil product |
|---|---|
| 5-bromo-3-isopropyl-6-methyluracil | 5-bromo-3-isopropyl-6-methyl-1-uracilbutyric acid. |
| 3-cyclohexyl-5,6-trimethyleneuracil | 3-cyclohexyl-5,6-trimethylene-1-uracilpropionic acid. |
| 3-phenyl-5-bromo-6-methyluracil | 5-bromo-3-phenyl-6-methyl-1-uracilpropionic acid. |
| 3-(3,4-dichlorophenyl)-5,6-dimethyluracil | 3-(3,4-dichlorophenyl)-5,6-dimethyl-1-uracilpropionic acid. |
| 5-chloro-3-sec.-butyl-6-methyluracil | 5-chloro-3-sec.-butyl-6-methy-1-uracilpropionic acid. |
| 3-isopropyl-5,6-tetramethyleneuracil | 3-isopropyl-5,6-tetramethylene-1-uracilpropionic acid. |
| 3-isopropyl-5-bromouracil | 3-isopropyl-5-bromo-1-uracilpropionic acid. |
| 3-isopropyl-5-bromo-6-methyl-2-thiouracil | 3-isopropyl-5-bromo-6-methyl-2-thiouracil-1-propionic acid. |
| 3-tert.-butyl-5-bromouracil | 3-tert.-butyl-5-bromo-1-uracilpropionic acid. |
| 3-tert.-amyl-5-methoxy-6-methyluracil | 3-tert.-amyl-5-methoxy-6-methyl-1-uracilpropionic acid. |
| 5-bromo-3-sec.-butyl-6-methyluracil | 5-bromo-3-sec.-butyl-6-methyl-1-uracilpentanoic acid. |

*Example 12.—1-isopropyl-3,6-dimethyluracil*

A solution of 23.2 parts of 1-isopropyl-3-methylurea and 41 parts of 41% diketene in acetone in 100 parts of benzene is heated at reflux for 16 hours. The solution is then cooled and filtered to remove 4.7 parts of unreacted urea. The filtrate is evaporated to a semi-solid mass which is triturated in hexane and filtered. The 18.5 parts of solid thus obtained appears to be a mixture of the desired product with starting urea. Recrystallization from water gives 6.2 parts of 1-isopropyl-3,6-dimethyluracil melting at 162° C. The following uracils can be prepared in a similar manner by substituting equivalent amounts of the listed urea reactants for the 1-isopropyl-3-methylurea:

| Urea | Uracil product |
|---|---|
| 3-methoxypropyl-1-decahydronaphthylurea | 3-decahydronaphthyl-1-(3-methoxypropyl)-6-methyluracil. |
| 3-methoxyisopropyl-1-cyclohexylurea | 3-cyclohexyl-1-methoxyisopropyl-6-methyluracil. |
| 3-cyanopropyl-1-cyclohexylurea | 1-(3-cyanopropyl)-6-methyl-3-cyclohexyluracil. |

*Example 13.—Preparation of 1-formyl-3-isopropyl-5-bromo-6-methyluracil*

A mixture of 49.4 parts by weight of 3-isopropyl-5-bromo-6-methyluracil and 41.8 parts by weight of 90% formic acid is heated at 90–95° C. with stirring for 1½ hours. The hot solution is then poured into 250 ml. of water and the product filtered. After drying, there is obtained essentially pure 1-formyl-3-isopropyl-5-bromo-6-methyluracil.

The following 1-formyl substituted uracils can be similarly prepared by substituting an equivalent amount of an appropriate substituted uracil for 3-isopropyl-5-bromo-6-methyluracil:

3-sec.-butyl-1-formyl-5-bromo-6-methyluracil
3-sec.-butyl-1-formyl-5-chloro-6-methyluracil
3-phenyl-1-formyl-5-bromo-6-methyluracil
3-cyclohexyl-1-formyl-5-nitro-6-methyluracil
3-m-chlorophenyl-1-formyl-5-chloro-6-methyluracil
3-isopropyl-1-formyl-5,6-trimethyluracil

*Example 14.—Preparation of 5-bromo-3-cyclohexyl-1-($\beta$-hydroxyethyl)-6-methyluracil*

A mixture of 287 parts of 5-bromo-3-cyclohexyl-6-methyluracil, 40 parts of sodium hydroxide, 500 parts of water and 500 parts of alcohol is stirred and heated until solution occurs. The solvents are stripped at reduced pressure and the solid is dried at 120° C. in a vacuum oven until completely dry. The solid is stirred with 1000 parts of dimethyl formamide and 97 parts of ethylene carbonate. It is heated for 3 hours at reflux, then cooled and flooded with ice water. The solid 5-bromo-3-cyclohexyl-1-($\beta$-hydroxyethyl)-6-methyluracil is filtered off, and may be recrystallized from solvents such as nitromethane, chlorethene, or aqueous alcohols if desired.

The following uracils can be prepared in a similar fashion by substituting a listed uracil reactant, in equivalent amount, for the 5-bromo-3-cyclohexyl-6-methyluracil of Example 14:

| Uracil reactant | Uracil product |
|---|---|
| 4-bromo-3-sec.-butyl-6-methyluracil | 5-bromo-3-sec.-butyl-1-($\beta$-hydroxyethyl)-6-methyluracil. |
| 3-sec.-butyl-5-chloro-6-methyluracil | 3-sec.-butyl-5-chloro-1-$\beta$-hydroxyethyl)-6-methyluracil. |
| 3-sec.-butyl-6-methyl-5-nitrouracil | 3-sec.-butyl-1-($\beta$-hydroxyethyl)-6-methyl-5-nitrouracil. |
| 5-chloro-3-isopropyl-6-methyluracil | 5-chloro-1-($\beta$-hydroxyethyl)-3-isopropyl-6-methyluracil. |
| 5-chloro-3-cyclohexyl-6-methyluracil | 5-chloro-3-cyclohexyl-1-($\beta$-hydroxyethyl)-6-methyluracil. |
| 3-butyl-5-methyluracil | 3-butyl-1-($\beta$-hydroxyethyl)-5-methyluracil. |
| 5-bromo-6-methyl-3-phenyluracil | 5-bromo-1-($\beta$-hydroxyethyl)-6-methyl-3-phenyluracil. |
| 5-bromo-6-methyl-3-(3-methylcyclohexyl)uracil | 5-bromo-1-($\beta$-hydroxyethyl)-6-methyl-3-(3-methylcyclohexyl)uracil. |

*Example 15*

A. *Preparation of 5-bromo-3-sec.-butyl-1-ethylmercuri-6-methyluracil.*—A solution of 28.7 parts of 3-sec.butyl-5-bromo-6-methyluracil in 100 parts of water and 100 parts of ethanol containing 4.2 parts of sodium hydroxide is stirred as 91.2 parts of a 31.5% solution of ethyl mercury acetate in 200 parts of ethanol and 200 parts of water is gradually added. The precipitate which forms immediately is stirred for a short time, then filtered and washed with aqeous alcohol. The solid, 5-bromo-3-sec.-butyl-1-ethylmercuri-6-methyluracil is recrystallized from acetonitrile or nitromethane.

B. *Preparation of 5-bromo-3-sec.-butyl-6-methyl-2',3',5',-tri-O-benzoyluracil ribofuranoside.*—A mixture of 48 parts of 2,3,5-tri-O-benzoyl-$\beta$-D-ribofuranosyl chloride (U.S. 2,885,396) is dissolved in 200 parts of xylene. This is gradually added to an anhydrous refluxing suspension of 48.9 parts of 5-bromo-3-sec.-butyl-1-ethylmercuri-6-methyluracil in 800 parts of xylene. After 2 hours at reflux it is filtered through celite while hot, concentrated and cooled to induce crystallization. The 5-bromo-3-sec.-butyl-6-methyl-2',3',5'-tri-O-benzoyluracil ribofuranoside is filtered off, washed with pentane and dried.

C. *Preparation of 5-bromo-3-sec.-butyl-6-methyl-1-ribofuranosyluracil.*—To 100 parts of ethanol, sat- urated with ammonia at 0° C., is added 7.0 parts of 5-bromo-3-sec.-butyl-6-methyl-2',3',5'-tri-O-benzoyluracil ribofuranoside. The mixture is stirred and allowed to stand for 7 days. The resulting solution is concentrated to dryness at reduced pressure. The residue is taken up in 100 parts of water and extracted 3 times with 50 part portions of ether. The ether extract is discarded and the aqueous layer is evaporated to dryness. The remaining solid 5-bromo-3-sec.-butyl-6-methyl-1-ribofuranosyluracil thus prepared is sufficiently pure for formulation.

The following glycosides can be prepared by substituting the indicated uracil and benzoylated glycosyl chloride for 5-bromo-3-sec.-butyl-6-methyluracil and 2,3,5-tri-O-benzoyl-$\beta$-D-ribofuranosyl chloride in Example 15:

5-bromo-1-glucopyranosyl-6-methyl-3-phenyluracil
5-bromo-3-isopropyl-6-methyl-1-ribofuranosyluracil
5,6-dimethyl-1-glucopyranosyl-3-isopropyluracil
3-cyclohexyl-1-ribofuranosyl-5,6-trimethyleneuracil
3-butyl-1-glucopyranosyl-5-methyluracil
3-cyclohexyl-1-glucopyranosyl-6-methyluracil

HERBICIDAL PREPARATIONS—LIQUID PREPARATIONS

*Example 16.—Aqueous suspension*

| | Percent |
|---|---|
| 5-bromo-3-cyclohexyl-1,6-dimethyluracil | 28.0 |
| Sodium lignin sulfonate | 15.0 |
| Hydrated attapulgite | 2.0 |
| Sodium pentachlorophenate | 0.5 |
| Water | 53.7 |
| Disodium phosphate | 0.8 |

The above ingredients are mixed and pebble-milled or sand-milled until the average particle size of the active material is less than 5 microns. The resulting stable thixotropic suspension does not cake and can be readily diluted with water to form a dilute, very slow settling suspension which requires no agitation during application.

This aqeous suspension, applied as a directed lay-by spray at 1 to 2 pounds of active ingredient per acre in 30 gallons of water, gives good pre-emergence control of crab grass, wild oats, lamb's quarters, chickweed, foxtail, annual morning glory and mustard in sugar cane, corn, broom corn, cotton, and sorghum.

At this rate, the 5-chloro-3-cyclohexyl-1,6-dimethyluracil gives excellent pre-emergence control of annual grasses and broad-leaf weeds in cotton. The following uracils similarly formulated and when used in equivalent amounts, will give similar results:

5-bromo-3-cyclohexylmethyl-1,6-dimethyluracil
5-bromo-3-(cyclohexylmethyl)-6-methyl-1-trichloromethylthiouracil
1-acetyl-5-bromo-3-(cyclohexylmethyl)-6-methyluracil

*Example 17.—Aqueous suspension*

| | Percent |
|---|---|
| 3-pyridyl-1-methyl-5,6-trimethyleneuracil | 25 |
| Sodium lignin sulfonate | 15 |
| Pentachlorophenol | 1.0 |
| Water | 59 |

These ingredients are sand-milled until the particles are under 5 microns in diameter.

Twenty to forty pounds (active) of this preparation are suspended in 80–120 gallons of water and sprayed around a tank farm in a semiarid area, just prior to the rainy season.

This treatment effectively controls such annual weeds as crab grass, ryegrass, foxtail, goose grass, chickweed, henbit, mustard, and pigweed growing around the tanks.

The following uracils can be similarly formulated, and when used in equivalent amounts, will give similar results:

3-(3-chloro-1-methylpropyl)-1-benzylthio-5-methyluracil
3-naphthyl-5-fluoromethyl-6-methyl-1-trichloromethylthiouracil
3-(5,6,7,8-tetrahydronaphthyl)-1-butyl-5-hydroxymethyluracil
3-methyl-5-bromo-6-bromomethyl-1-(trichloromethylthio)uracil
3-(3,4-dichlorophenyl)-5-bromo-6-methyl-1-(methylthio)uracil
3-(3,4-dibromophenyl)-5-bromo-6-methyl-1-acetyluracil
3-(p-fluorophenyl)-1-p-chlorobenzylthio-5-methyluracil
5-bromo-3-(cyclohexylmethyl)-1,6-dimethyluracil
3-(3,4-dimethylphenyl)-5-bromo-1,6-dimethyluracil
3-(m-tolyl)-5-bromo-6-bromomethyl-1-methyluracil
3-(3-methyl-4-chlorophenyl)-1,6-dimethyluracil
3-(3-chloro-4-methoxyphenyl)-1-acetyluracil
3-(p-nitrophenyl)-6-butoxy-5-bromo-1-chloroacetyluracil
3-(3-chloro-4-nitrophenyl)-5-bromo-6-methyl-1-(ethylthio)uracil

*Example 18.—Oil suspension*

|  | Percent |
|---|---|
| 3 - cyclohexyl - 6 - methyl - 1 - (trichloromethylthio)-uracil | 40 |
| Soya lecithin | 3 |
| Substantially aliphatic, low viscosity mineral oil, e.g., kerosene or diesel oil | 57 |

The oil suspension is prepared by pregrinding the active material and mixing it with the other components with agitation, or by blending all the components together, then pebble-milling or sand-milling them to reduce the particle size of the active component. The product is suitable for dilution with weed oils to form an oil spray.

This formulation is diluted with 80 gallons of a herbicidal oil such as Lion Herbicidal Oil No. 6 and applied at 12 pounds of active ingredient per acre for general overall weed control along cyclone fences and railroad ballast.

Good control is obtained for several months. Quack grass, pigweed, ryegrass, mustard, foxtail, flower-of-an-hour, cheat, witch grass, buttonweed, and jimson weed are controlled.

Other compounds which give good weed control when formulated and used in this fashion are:

1-acetyl-3-cyclohexyl-5-bromo-6-methyluracil
1-acetyl-3-(sec.-butyl)-5-chloro-6-methyluracil
3-isopropyl-5-chloro-6-methyl-1-trichloroacetyluracil
3-(tert.-butyl)-5-chloro-6-methyl-1-trichloromethylthiouracil

*Example 19.—Oil solution*

|  | Percent |
|---|---|
| 3 - sec.-butyl-1-trichloromethylthio-5-bromo-6-methyluracil | 20 |
| Pentachlorophenol | 10 |
| Xylene | 70 |

The solids are dissolved in the xylene.

This oil solution controls weeds in oil tank yards. When extended with 60 gallons of herbicidal oil and applied in this volume at the rate of 20 pounds of active ingredients per acre, this combination gives excellent control of a rank growth of herbaceous broadleaved and grass weeds such as ragweed, pigweed, lamb's-quarters, fall panicum, crabgrass, giant foxtail, barnyard grass, goldenrod, smartweed, and Johnson grass. Using a similar formulation and rate of 5-bromo-3-(1-ethyl propyl)-6-methyl-1-trichloromethylthiouracil as shown above similar herbicidal utility can be obtained.

*Example 20.—Aqueous dispersions*

|  | Percent |
|---|---|
| 3-cyclohexyl-5-chloro-1,6-dimethyluracil | 15.00 |
| 3-(4-chlorophenyl)-1,1-dimethylurea | 15.00 |
| Sodium lignin sulfonate | 15.00 |
| Hydrated attapulgite | 1.75 |
| Sodium hydroxide | 0.25 |
| Water | 53.00 |

A mixture of these components is first made with 3% of the water withheld. The mixture is wet-milled until the particles are under 10 microns in size. Dilute caustic or water is added to make up the water deficiency and to adjust the pH to 8.0.

This aqueous dispersion is extended with water to a concentration of 10 pounds of active ingredients per 100 gallons and sprayed at a volume rate of about 200 gallons per acre along highway guard rails and around signposts. Excellent control of crabgrass, quack grass, fall panicum, broomsedge, ragweed, goldenrod, barnyard grass, foxtail, mustard, lamb's-quarters, spotted spurge, annual morning glory, and smartweed is obtained.

*Example 21.—Aqueous suspension*

|  | Percent |
|---|---|
| 5-bromo-3-norbornyl-1,6-dimethyluracil | 30.00 |
| Sodium lignin sulfonate | 15.00 |
| Hydrated attapulgite | 1.75 |
| Anhydrous disodium phosphate | 0.80 |
| Sodium pentachlorophenate | 0.50 |
| Water | 51.95 |

These components are mixed together and pebble-milled or sand-milled until the active material is below 5 microns in particle size. The resultant stable aqueous suspension can be readily diluted with water to give a highly dispersed, very slow settling composition which can be sprayed from equipment having no means for agitating the suspension.

This composition is applied at 0.75 to 2 pounds of active ingredient per acre in 40 gallons water for control of broadleaf and grass weeds such as cheat, foxtail, crabgrass, chickweed, velvetleaf and ragweed growing in corn, sorghum, sugarcane, safflower and asparagus.

*Example 22.—Emulsifiable oil*

|  | Percent |
|---|---|
| 5-bromo-3-isopropyl- 6 -methyl - 1 - (trichloromethylthio)uracil | 25 |
| Xylene | 70 |
| Nonylphenoxypolyoxyethylene ethanol | 5 |

The emulsifiable oil is prepared by mixing these components until a homogeneous solution results. It can be emulsified in water for application.

This emulsifiable oil is useful for weed control in lumber yards, fire-control lanes, and along railroads. When this composition is diluted with 100 gallons of water per acre and sprayed from a railroad spray car at 15–20 pounds of active ingredient per acre, mixed vegetation such as quack grass, crabgrass, nutsedge, Johnson grass, Bermuda grass, brome grass, cocklebur, lamb's-quarters, and ragweed is controlled for an extended period.

The same amount of this formulation is applied in 60 gal. of diesel oil per acre to the railroad ballast located on railroad rights-of-way where it is unusually difficult to control weeds with most commercial herbicides. Excellent control of the above-listed weeds is obtained.

*Example 23.—Emulsifiable oil*

|  | Percent |
|---|---|
| 3-cyclohexyl-5-methoxy-1,6-dimethyluracil | 15 |
| Mixed polyoxyethylene ethers and oil-soluble sulfonates | 3 |
| Isophorone | 40 |
| Alkylated naphthalene, principally α-methylnaphthalene | 42 |

These components are mixed together to form a homogeneous solution.

Twenty-five to thirty pounds (active) of this formulation are extended in 60 gallons of herbicidal oil and applied with a sprayer along roadsides and beneath highway signs in a semi-arid area. Application is made when the weeds are 2 to 6 inches tall, and controls the growth of such troublesome annual weeds as crabgrass, foxtail, wild oats, cheat grass, and Russian thistle.

The following uracils can be similarly formulated, and when used in equivalent amounts, will give similar results:

3-cyclopentylmethyl-1,5,6-triethyluracil
3-cyclopentenyl-5-cyano-1-ethoxycarbonylmethyl-6-methyluracil
3-(4-methoxy-3-cyclohexene-1-methyl)-5-iodo-1,6-dimethyluracil
3-(4-methoxycyclohexylmethyl)-5-bromo-1,6-dimethyluracil
3-(3-cyanopropyl)-5-bromo-1-1,6-dimethyluracil
3-cyclohexyl-6-methoxy-5-chloromethyl-1-methyluracil
1-acetyl-3-(3-amyl)-5-methylthiomethyl-6-methyluracil
3-(1,2-dimethylcyclopentyl)-5-carboxymethylthiomethyl-1-methyl-6-(3-chlorobutyl)uracil
3-(bicyclo[2,2,2]oct-5-en-2-yl)-5-phenylthiomethyl-1,6-dimethyluracil
5-bromo-1-(2,4-dichlorophenoxyacetyl)-3-(4-methoxycyclo-hexyl)-6-methyluracil
5-bromo-3-sec.-butyl-1-(2,4-dichlorophenoxyacetyl)-6-methyluracil

*Example 24.—Oil solution*

|  | Percent |
|---|---|
| 5 - bromo - 3 - (1,3 - dimethylbutyl) - 6 - methyl - 1 - trichloromethyl thiouracil | 25 |
| Methyl isoamyl ketone | 50 |
| Alkylated naphthalene, principally α-methyl naphthalene | 25 |

These ingredients are combined and agitated until a homogeneous solution is obtained.

Eight to twelve gallons of this preparation are mixed with 65 gallons of herbicidal oil and applied along access trails in a park. The application covers one acre and is applied as the weeds reach a height of 2 to 6 inches.

Such annual weeds as crabgrass, chickweed, Russian thistle, cheat grass and the foxtails are controlled.

The following uracils can be similarly formulated and when used in equivalent amounts, will give similar results:

3-allyl-5,6-dimethyl-1-(2,3,6-trichlorophenylacetyl)uracil
3-(2,3-dibromopropyl)-5,6-diethyl-1-trichloroacetyluracil
1,3-di-(2,3-dichloropropyl)-5-chloro-6-methyluracil
1-acetyl-5-bromo-3-(1,3-dimethylbutyl)-6-methyluracil
1-(2-cyanoethyl)-3-norbornyluracil
5-bromo-3-tert.-butyl-1,6-dimethyluracil
1-acetyl-5-chloro-3-(1,3-dimethylbutyl)-6-methyluracil
3-propynyl-5-methyl-1-uracilacetic acid, ethyl ester
3-(3-amyl)-5-chloro-6-methyl-1-trichloromethylthiouracil
3-cyclohexyl-1,6-dimethyluracil
5-bromo-3-tert.-butyl-6-methyl-1-trichloromethylthiouracil
1-(dodecylthio)-3,5 6-triethyluracil
1-(2,3-dichloropropylthio)-3,5,6-trimethyluracil
5-chloro-3-(1,3-dimethylbutyl)-6-methyl-1-trichloromethylthiouracil
5-bromo-3-(3-methoxypropyl)-6-methyl-1-phenylthiouracil
3-sec.-butyl-5-bromo-1-benzylthio-6-methyluracil
3-tert.-butyl-5-bromo-1-p-chlorophenylthio-6-methyluracil
3-tert.-butyl-5-bromo-1-(2,4-dinitrophenylthio)-6-methyluracil
3-tert.-butyl-5-bromo-1-(3,4-dimethylbenzylthio)-6-methyluracil
3-cyclohexyl-5-chloro-1-(p-tolylthio)-6-methyluracil
3-sec.-butyl-5-bromo-1-(p-chlorobenzylthio)uracil
3-sec.-butyl-5-methyl-1-dipropylcarbamyluracil
3-tert.-butyl-5-methyl-1-dimethylcarbamyluracil
3-tert.-butyl-5-methyl-1-carbamyluracil

*Example 25.—Emulsifiable oil suspension*

|  | Percent |
|---|---|
| 3 - cyclohexyl - 6 - methyl - 1 - (trichloromethylthio) - uracil | 25 |
| Blend of polyalcohol carboxylic esters and oil-soluble petroleum sulfonates | 6 |
| Diesel oil | 69 |

These components are mixed together and milled in a roller mill, pebble mill, or sand mill until the particles of the active component are below 10 microns in size. The resulting suspension can be emulsified in water or diluted further with weed oils for spray application.

This formulation is diluted with 60 gallons of Lion Herbicidal Oil No. 6 and applied at 10-15 pounds of active ingredient per acre for the control of morning glory, yarrow, ragweed, wild carrot, quack grass, witch grass, perennial rye grass, pigweed, wild mustard, foxtail, flower-of-an-hour, crabgrass, and oak and maple seedlings growing along railroad rights-of-way. Excellent control is obtained.

The following compounds can be formulated and used in the same fashion:

5-bromo-3-sec.-butyl-6-methyl-1-(2,3,6-trichlorophenylacetyl)uracil
5-chloro-3-tert.-butyl-1,6-dimethyluracil
5,6-dimethyl-3-isopropyl-1-(2,4-dichlorophenoxyacetyl)uracil
3-cyclohexyl-5,6-dimethyl-1-(diethoxythionophosphoryl)uracil
5-chloro-3-fenchyl-6-methyl-1-(trichloroacetyl)uracil
5-chloro-6-methyl-3-isopropyl-1-(trichloromethylthio)-uracil
1-acetyl-5-bromo-3-tert.-butyl-6-methyluracil

SOLID PREPARATIONS

*Example 26.—Tank mix*

An 80% wettable powder is prepared by blending and micropulverizing the following compositions:

|  | Percent |
|---|---|
| 3 - sec. - butyl - 1 - trichloromethylthio - 5 - bromo-6-methyluracil | 80.00 |
| Polyoxyethylated tall oil | 3.00 |
| Low viscosity methyl cellulose | 0.25 |
| Attapulgite clay | 16.75 |

This wettable powder, at 8 pounds of active ingredient, is tank-mixed, in 100 gallons of water, with 6 pounds of 2,3,6-trichlorobenzoic acid, dimethyl amine salt in 3 gallons of water. The mixture is sprayed at a volume rate of 200 gallons per acre on a mixed population of noxious weeds and brush to give good control of bindweed, leafy spurge, Canada thistle, trumpet creeper, honeysuckle, poison ivy, quack grass, and panic grass.

*Example 27.—Oil-dispensible powder*

|  | Percent |
|---|---|
| 3 - cyclohexyl - 1 - trichloromethylthio - 5 - chloro-6-methyluracil | 40 |
| 3-amino-1,2,4-triazole | 10 |
| Mixed polyalcohol carboxylic acid esters and oil-soluble sulfonates | 5 |
| Attapulgite clay | 45 |

These components are blended and micropulverized. Fifteen pounds of active ingredients, dispersed in 100 gallons of diesel oil and sprayed on an acre gives excellent control of Canada thistle, poison ivy, spurge, quack grass, barnyard grass, ragweed, flower-of-an-hour, dewberry, crabgrass, and vetch.

*Example 28.—Wettable powder*

| | Percent |
|---|---|
| 3 - cyclohexyl - 1 - trichloromethylthio - 5 - bromo-6-methyluracil | 40.00 |
| 3-(3,4-dichlorophenyl)-1,1-dimethylurea | 40.00 |
| Alkyl naphthalene sulfonic acid, Na salt | 1.75 |
| Partially desulfonated sodium lignin sulfonate | 1.50 |
| Attapulgite clay | 16.75 |

The above components are blended, micropulverized, and reblended.

This wettable powder, dispersed in water to give a concentration of 20 pounds of active ingredients per 100 gallons, provides a spray mixture that is outstanding for controlling weeds around industrial warehouses. The spray mixture is applied at 150 gallons per acre and gives good control of smartweed, witchgrass, velvet leaf, sow thistle, ragweed, pigweed, carpetweed, crabgrass, annual morning glory, and broomsedge. The area remains free of weeds for an extended period.

*Example 29.—Wettable powder*

| | Percent |
|---|---|
| 3 - isopropyl - 1 - trichloromethylthio - 5 - bromo - 6-methyluracil | 50 |
| 2 - methylmercapto - 4 - ethylamino - 6 - isopropyl-amino-s-triazine | 25 |
| Polyoxyethylated tall oil ester | 3 |
| Partially desulfonated Ca lignin sulfonate | 1 |
| Calcined, nonswelling montmorillonoid clay (Pike's Peak clay) | 21 |

These components are blended and micropulverized.

This composition is applied at the rate of 20 pounds of active ingredients per acre in 150 gallons of water to a railroad ballast area. Excellent control of quack grass, mustard, flower-of-an-hour, buttonweed, pigweed, ragweed, annual ryegrass, bromegrass, henbit, goldenrod, asters, and foxtail is obtained. The ballast remains free of weeds for an extended period.

*Example 30.—Wettable powder*

| | Percent |
|---|---|
| 3-isopropyl-5-chloro-1,6-dimethyluracil | 30.00 |
| 3-sec.-butyl-5-bromo-6-methyluracil | 30.00 |
| Dioctyl sodium sulfosuccinate (85–15 condensate with sodium benzoate) | 0.75 |
| Low viscosity methyl cellulose | 0.30 |
| Kaolin clay | 35.95 |
| Synthetic fine silica | 3.00 |

These components are blended, micropulverized, and reblended.

A spray containing 25 pounds of this formulation per 100 gallons of water, applied at a volume rate of 150 gallons per acre to the edge of an airport runway, along boundary fences, around guard houses, signal lights, and markers kills existing vegetation and keeps the area free of weeds for an extended period. Excellent control of such pernicious weeds as Johnson grass, crabgrass, ragweed, pigweed, pokeweed, annual morning glory, mustard, honeysuckle, fall panicum, poison ivy, and goldenrod is obtained.

*Example 31.—Wettable powder*

A wettable powder is prepared by blending the following components, micropulverizing them until the particles are below 50 microns in size and then reblending:

| | Percent |
|---|---|
| 5-bromo-1,6-dimethyl-3-isopropyluracil | 80.00 |
| Alkyl naphthalene sulfonic acid, sodium salt | 2.00 |
| Sodium lignin sulfonate | 1.00 |
| Finely divided synthetic silica | 2.00 |
| Calcium sulfate | 3.00 |
| Montmorillonoid clay | 12.00 |

This wettable powder preparation is used for control of vegetation on industrial sites and railroad ballast. When applied at 10 to 20 pounds of active ingredient per acre in 100 gallons of water, excellent control of lamb's-quarters, evening primrose, pokeweed, cocklebur, goose grass, crabgrass, broomsedge, love grass, ragweed, chickweed, foxtail, and barnyard grass is obtained.

The following compounds are formulated and used in a similar fashion:

5-bromo-1,3-diisopropyl-6-ethyluracil
5-chloro-3-cyclohexyl-1-methyluracil
3-cyclohexyl-5,6-dimethyl-1-ethyluracil
3-sec.-amyl-5,6-dimethyl-1-hydroxymethyluracil
5-chloro-3-norbornyl-1,6-dimethyluracil
1-acetyl-5-chloro-3-tert.-butyl-6-methyluracil

*Example 32.—Wettable powder*

The following ingredients are formulated in the same manner as in Example 31, but in addition are passed through an air attrition mill, such as an air-reductionizer, to reduce the particle size to below 10 microns:

| | Percent |
|---|---|
| 5-chloro-3-cyclohexyl-1,6-dimethyluracil | 80.0 |
| Dioctylsodium sulfosuccinate concreted with sodium benzoate (Aerosol OTB) | 2.0 |
| Partially desulfonated sodium lignin sulfonate | 1.0 |
| Calcined, non-swelling montmorillonoid type clay (Pike's Peak clay) | 17.0 |

This composition is used for pre-emergence application in agricultural crops such as corn, sugar cane, sorghum, carrots, asparagus, and safflower. It is dispersed in 40 gallons of water and sprayed with a pressure sprayer. When applied at 0.75 to 2.0 pounds of active ingredient per acre, excellent control of ragweed, lamb's-quarters, purslane, mustard, crabgrass, foxtail, chickweed, seedling bindweed, and rye grass is obtained.

*Example 33.—Wettable powder*

A wettable powder is prepared from the following ingredients by blending and then micropulverizing them until all of the particles are below 50 microns in diameter. They are then reblended:

| | Percent |
|---|---|
| 3 - cyclohexyl - 6 - methyl - 1 - (trichloromethyl-thio) uracil | 50.00 |
| Alkylnapththalene sulfonic acid, sodium salt | 1.75 |
| Low viscosity methyl cellulose | 0.25 |
| Calcined, non-swelling montmorillonoid-type clay (Pikes Peak clay) | 48.00 |

This composition is useful for soil-foliage application to seedling tender annual weeds.

For use 2 to 4 pounds of the formulation are added, with stirring, to 40 gallons of water containing 2½ pounds of trimethyl nonyl polyethylene glycol ether. The resulting suspension, when applied as a soil-foliage spray to the parking area of a drive-in theater, gives good control of annual weeds such as crabgrass, foxtail, and chickweed.

*Example 34.—Wettable powder*

| | Percent |
|---|---|
| 3-cyclohexyl-1,6-dimethyluracil, 2:1 complex with phenol | 25.0 |
| Sodium lauryl sulfate | 0.6 |
| Sodium lignin sulfonate | 2.0 |
| Synthetic fine silica | 72.4 |

These ingredients are blended and micropulverized until the crystalline complex particles are under 50 microns in diameter. The mixture is then reblended.

This wettable powder is extended in 80 gallons of Lion Herbicidal Oil No. 6 and applied as a foliar-soil spray at 30 pounds (active complex) per acre to weeds growing along a fence row. Excellent control of crabgrass, foxtail, barnyard grass, quack grass, pigweed, evening primrose, and black-eyed Susan is obtained.

Example 35.—Wettable powder

| | Percent |
|---|---|
| 3-(m-chlorophenyl)-5-nitro-1-methyl-6-chlorouracil | 25.00 |
| Sodium lauryl sulfate | 0.5 |
| Low viscosity methyl cellulose | 0.25 |
| Attapulgite clay | 74.25 |

These components are blended, then ground in a mill with air classification until all particles are below 20 microns in diameter.

One hundred to one hundred twenty pounds of this formulation are mixed with enough water to form a slurry. This slurry is suspended in 200 to 250 gallons of water.

The material is kept suspended by mechanical or bypass agitation. It is sprayed, in the spring, at the rate of 25 pounds (active ingredient) per acre around signposts where such weeds as crabgrass, foxtail, giant ragweed, chickweed, mustard and lamb's-quarters are a problem. When applied pre-emergence, or when the above weeds are in the two to three-leaf stage, this preparation provides good weed control.

The following compounds, similarly formulated and used, will give good weed control:

1-acetyl-3-(2-cyanoethyl)-5-fluoro-6-propyluracil
3-(3-hydroxypropyl)-5-thiocyanato-1,6-dimethyluracil
3-(3-methoxypropyl)-5-propoxy-1-ethyluracil
3-phenyl-5-propyl-1-chloracetyl 6-ethyluracil
3-(3,4-dimethylbenzyl)-5-chloro-6-chloromethyl-1-methyluracil
3-(allyl)-1,5,6-trimethyluracil
3-(9-decenyl)-5-methylthio-1,6-dimethyluracil
1-acetyl-3-(propyn-2-yl)-6-butyluracil
6-bromo-3-cyclopentenyl-5-(2-hydroxyethyl)-1-(trichloromethylthio)uracil

Example 36.—Wettable powder

| | Percent |
|---|---|
| 1-methylthiocarbamyl-5-chloro-3-sec.-butyl-6-methyluracil | 25 |
| Dodecyl phenol-ethylene oxide condensation product | 3 |
| Low viscosity polyvinyl alcohol | 1 |
| Synthetic fine silica | 40 |
| Attapulgite clay | 31 |

These components are blended, micropulverized until all particles are below 325 mesh (44 microns), and then reblended.

Thirty to thirty-five pounds (active) of this powder preparation are slurried with water and suspended in 125 gallons of water.

This suspension is applied with a sprayer to an acre of ground around a refinery. Such weeds as crabgrass, goose grass, the foxtails, lamb's-quarters, prostrate knotweed, carpetweed, and ragweed are controlled.

The following uracils, when similarly formulated and used, give good weed control:

1-glucopyranosyl-5,6-dimethyl-3-norbornenyluracil
1-cyanomethyl-3-fenchyl-6-methyluracil
1-methoxymethyl-3-cyclooctyl-6-methyluracil
3-cyclohexyl-6-methyl-1-ribofuranosyluracil
1-(2,2-dichloropropionyl)-3-cyclobutyl-5,6-trimethyleneuracil
3-sec.-butyl-5-chloro-1-glucopyranosyl-6-methyluracil
5-bromo-3-sec.-butyl-1-diphenylcarbamyl-6-methyluracil
1-(p-chlorophenylthio)-3-cyclohexyl-5,6-tetramethyleneuracil
5-bromo-3-cyclohexyl-1-(2,4-dinitrophenylthio)-6-methyluracil
5-chloro-6-methyl-3-isopropyl-1-(p-tolylthio)uracil
1-(2,6-dichlorophenylacetyl)-3-(2-buten-3-yl)-5,6-dimethyluracil
5-bromo-3-isopropyl-6-methyl-1-(2,4-dichlorophenoxyacetyl)uracil
3-cyclohexyl-5,6-trimethylene-1-benzoyluracil

Example 37.—Granules

| | Percent |
|---|---|
| 5-bromo-1,6-dimethyl-3-isopropyluracil | 10 |
| Anhydrous sodium sulfate | 10 |
| Non-swelling sub-bentonite clay | 80 |

The components are blended and micropulverized, then moistened with water and granulated. The product is then dried and screened.

The granules are applied by hand for "spot treatment" of undesirable bunch grasses growing in agricultural areas. An application of 15 to 20 pounds of active ingredient per acre gives good control of orchard and fescue grasses.

Other compounds which can be formulated and used in this fashion are:

1-acetyl-5-bromo-3-isopropyl-6-methyluracil
1-acetyl-3-cyclohexyl-5,6-trimethyleneuracil
1-chloroacetyl-3-cyclohexyl-5,6-dimethyluracil
5-bromo-3-isopropyl-6-methyl-1-trichloroacetyluracil
3-isopropyl-5-chloro-1,6-dimethyluracil
5-chloro-3-(3a,4,5,6,7,7a-hexahydro-5-indanyl)-6-methyl-1-(trichloromethylthio)uracil
1-acetyl-5-chloro-3-(2-chloro-3a,4,5,6,7,7a-hexahydro-4,7-methano-5-indanyl)-6-methyluracil
1-acetyl-3-isopropyl-5,6-trimethyleneuracil

Example 38.—Granules

| | Percent |
|---|---|
| 3-sec.-butyl-5-chloro-6-methyl-1-trichloromethylthiouracil | 15 |
| Granular 8–15 mesh attapulgite clay | 85 |

This granular composition is prepared by dissolving the active ingredient in acetone and spraying this solution on the attapulgite granules while they are being tumbled. The granules are then dried.

These granules are applied by hand or by special spreaders at 10 to 25 pounds of active ingredient per acre. They control peppergrass, seedling Bermuda and Johnson grass, chickweed, perennial ryegrass, crabgrass, foxtail, smartweed, barnyard grass, goose grass, and quack grass on industrial sites, along boundary fences and railroad rights-of-way, in parking areas, along roadsides, and under billboards.

Other compounds which can be used in a like manner are:

1-(2,3,6-trichlorobenzoyl)-3-isopropyl-5-bromo-6-methyluracil
3-cyclopropyl-1-acetyl-5,6-tetramethyleneuracil
1-acetyl-5-bromo-3-isopropyl-6-methyluracil
3-cyclohexyl-1-(trichloromethylthio)uracil
5-chloro-1,6-dimethyl-3-phenyluracil
3-(3a,4,5,6,7,7a-hexahydro-4,7-methano-5-indanyl)-1-(trichloromethylthio)uracil
3-(x-bromonorbornyl)-1-hydroxymethyl-5,6-trimethyleneuracil
1-acetyl-5-chloro-6-methyl-3-isopropyluracil
3-phenyl-5-bromo-6-methyl-1-trichloromethylthiouracil

Example 39.—Granules

| | Percent |
|---|---|
| 3-(3-methylcyclohexyl)-1,6-dimethyl-5-chlorouracil | 10 |
| Kaolin clay | 87 |
| Low viscosity methyl cellulose | 3 |

These components are blended and micropulverized, moistened with water, moist granulated, dried and screened to give granules between 15 and 60 mesh.

This preparation is applied around oil and gas wells in semi-arid areas prior to the rainy season.

Thirty pounds (active) per acre of the preparation will effectively control weeds such as chickweed, wild oats, crab grass, cheat, and foxtail in these areas.

The following uracils can be similarly formulated, and when used in equivalent amounts, will give good weed control:

3-cyclooctyl-1-trichloromethylthio-5-bromo-6-methyluracil
1-acetyl-3-(3-amyl)-5-bromo-6-methyluracil
3-cyclododecyl-1-methyl-5-chloro-6-methyluracil
1-acetyl-3-(3-amyl)-5-chloro-6-methyluracil
3-(4-methoxycyclohexyl)-1,5,6-trimethyluracil
3-(m-trifluoromethylphenyl)-5-bromo-1,3-dimethyluracil
3-cyclohexyl-1-tert.-butylthio-5-bromo-6-methyluracil
3-cyclohexyl-1-(o-nitrophenylthio)-6-methyluracil
3-(3-methylcyclohexylmethyl)-1-(2,4-dichlorophenoxyacetyl)-5,6-trimethyleneuracil
5-bromo-1,6-dimethyl-3-phenyluracil
3-furfuryl-5-bromo-1,6-dimethyluracil
3-cyclohexyl-1-(2,3,6-trichlorophenylacetyl)-5-methyluracil

*Example 40.—Granules*

| | Percent |
|---|---|
| 3-sec.-butyl-1-acetyl-5-bromo-6-methyluracil | 12.5 |
| 2,4-dichlorophenoxyacetic acid, Na salt | 12.5 |
| Sodium sulfate, anhydrous | 10.0 |
| California sub-bentonite | 65.0 |

These compounds are blended, micropulverized, moistened with 15–20% water, moist-granulated, dried, and screened to 8–50 mesh.

The granules are distributed along the edges of freshwater lakes and brackish inlets at the rate of about 3 pounds per 1000 square feet. Good control of Eurasian water milfoil is obtained.

*Example 41.—Granules*

| | Percent |
|---|---|
| 3-isopropyl-1-trichloromethylthio-5-bromo-6-methyluracil | 2.00 |
| Alkyl naphthalene sulfonic acid, Na salt | 0.02 |
| Sodium chlorate 40%, sodium metaborate 60% | 97.98 |

The mixture of sodium chlorate and sodium metaborate is placed in a rotating drum. The uracil and wetting agent are blended, micropulverized, and then slurried in water. This water slurry is sprayed on the tumbling granular mixture.

This formulation is suited for spot applications to noxious, hard-to-kill perennial weeds and brush. The granules, when applied at the rate of about 1.5 pounds per 100 square feet around sign posts, guard rails, bridge abutments, switches, gas vents and meter houses, give excellent control of Johnson grass, bindweed, brambles, poison ivy, ragweed, pigweed, smartweed, Bermuda grass, crabgrass, witchgrass, fall panicum, Vasey grass, and morning glory. The urea remains free of weeds for an extended period. Infrequent retreatments at lower rates keep the area weed-free indefinitely.

*Example 42.—Pellets*

| | Percent |
|---|---|
| 3-cyclohexyl-5-iodo-1,6-dimethyluracil | 10 |
| Phenyl-1,1-dimethylurea | 10 |
| Sodium sulfate, anhydrous | 10 |
| Sodium lignin sulfonate | 10 |
| Kaolin clay | 30 |
| Mississippi sub-bentonite | 30 |

These components are blended, micropulverized, pug-milled with 15%–20% water, and extruded through ⅛-inch holes. The extrusions are then cut to ⅛-inch lengths and dried.

The pellets control brush along utility rights-of-way. They are applied to the soil around clumps of brush at the rate of about 2 ounces of pellets per clump. Control of persimmon, white and red oaks, hickory, sumac, slippery elm, and wild cherry is obtained by this treatment.

*Example 43.—Pellets*

| | Percent |
|---|---|
| 3-sec.-butyl-1-trichloromethylthio-5,6-trimethyleneuracil | 25 |
| Anhydrous sodium sulfate | 10 |
| Sodium lignin sulfonate | 25 |
| Ca, Mg bentonite | 55 |

The components are blended and micropulverized, then moistened with 18–20% water and extruded through die holes. The extrusions are cut as formed to give pellets and then dried.

These pellets are useful for weed control along highway guard rails, around bridges, cyclone fences, and in utility rights-of-way when applied at rates of 15–30 lbs. of active material per acre.

*Example 44.—Pellets*

| | Percent |
|---|---|
| 5-bromo-3-isopropyl-6-methyl-1-(trichloromethylthio)uracil | 25 |
| Alkyl naphthalene sulfonic acid, Na salt | 1 |
| Anhydrous sodium sulfate | 10 |
| Non-swelling montmorillonoid type clay (Pikes Peak clay) | 64 |

The components are blended and micropulverized, then wetted with 18–25% water and extruded through a die. The extrusions are cut into ⅛ inch pellets as they emerge. These pellets are then dried.

This formulation is used for dry application to the soil for control of undesirable woody plants in fence rows and utility rights-of-way. A basal application of one tablespoonful on the ground at the base of each brush cluster gives excellent control of birch, box elder, wild cherry, privet, willow, dogwood, oak, sweetgum, poplar, and spruce.

Other compounds which can be formulated and used in a like fashion are:
5-bromo-3-cyclohexyl-6-methyl-1-trichloromethylthiouracil
3-sec.-butyl-5-chloro-1,6-dimethyluracil
1-acetyl-3-phenyl-5-chloro-6-methyluracil
1-acetyl-5-chloro-3-cyclohexylmethyl-6-methyluracil

*Example 45.—Pellets*

| | Percent |
|---|---|
| 3-(m-methylbenzyl)-5,6-pentamethylene-1-(trichloromethylthio)uracil | 10 |
| Anhydrous sodium sulfate | 10 |
| Sodium lignin sulfonate | 10 |
| Kaolin clay | 35 |
| Nonswelling Ca, Mg bentonite | 35 |

These ingredients are blended and micropulverized, then moistened with 15–20% water and extruded through ⅛ inch die holes. The extrusions are cut into ⅛-inch lengths, and dried to firm pellets.

These pellets are distributed along firebreaks at the rate of 200–400 pounds per acre. This treatment, when made pre-emergence or before the weeds reach a height of ¾ inches, will control such weeds as seedling fescues, lamb's-quarters, ragweed, mustard, annual ryegrass, chickweed and crabgrass.

The following uracils can be prepared for use as described in Examples 18, 24, 25, 36, 37, 40, and 46, and when used in equivalent amounts, will give good weed control:

3-(1,2,3,4-tetrahydronaphthyl)-5-hydroxymethyl-6-methyl-1-phenylacetyluracil
3-indenyl-5-isopropylthio-1,6-dimethyluracil
3-benzyl-5-ethoxymethyl-6-methyl-1-formyluracil
3-furfuryl-5-bromomethyl-6-methyl-1-carbamyluracil
3-(β-phenethyl)-5-isopropoxy-6-methyl-1-ethylthio-2-thiouracil
3-(m-methylbenzyl)-5,6-pentamethylene-1-(trichloromethylthio)uracil 3-(3,4-dichlorobenzyl)-5-(tert.-butoxy)-6-methyl-1-(methylthio)uracil
3-[p-(sec.-butoxy)benzyl]-5-bromo-1-(trichloromethylthio)uracil
3-(p-nitrobenzyl)-5-butylthio-1,6-dimethyl-2-thiouracil
3-(4-isopropylcyclohexyl)-5,6-dimethyl-1-(methylthio)uracil
3-(norbornyl)-1-(p-isopropylbenzylthio)-5,6-dimethyluracil
3-(1,4,5,6-tetrachloro-7,7-dimethoxybicyclo[2,2,1]hept-5-en-2-ylmethyl)-5-bromo-1,6-dimethyluracil
3-(3a,4,5,6,7,7a-hexahydro-4,7-methano-5-indenyl)-5,6-dibromo-1-(trichloromethylthio)uracil
3-cyclopropylmethyl-5-methylthiol-6-methyl-1-(m-methylphenylthio)uracil
3-(4-methylcyclohexylmethyl)-6-propoxy-5-bromo-1-methyluracil
3-(4-isopropylcyclohexylmethyl)-1,5,6-trimethyluracil
3-(decahydro-1,4,5,8-dimethanonaphth-2 - ylmethyl) - 5 - bromo-6-methyl-1-(trichloromethylthio)uracil
3-(4-chlorocyclohexyl) - 5 - methoxymethyl - 6-methyl-1-(ethylthio)uracil
3-(α-naphthylmethyl)-5-bromo-1,6-dimethyluracil
3-(4-methylnaphth-1-yl)-1,5,6-trimethyluracil
3-(4-chloronaphth-1-yl)-5-bromo-1-dichloroacetyluracil
3-(2 - buten - 3 - yl) - 1-(2,6-dichlorophenylacetyl)-5,6-dimethyluracil
3-(2-buten-2-yl)-1,5-dimethyluracil
3-(p-butylbenzyl)-5-bromo-6-methyl-1-(trichloromethyl - thio)-uracil
3-(4 - isopropyl - 2 - methylbenzyl)-5-bromo-6-methyl-1-acetyluracil
3-(p-methoxybenzyl)-5-bromo-1-(phenylthio)uracil
3-cyclohexyl-1-hydroxymethyl-5,6-dimethyluracil

*Example 46.—Dusts*

| | |
|---|---|
| 5-chloro-3-norbornyl-1,6-dimethyluracil | 10.0 |
| Talc | 70.0 |
| Attapulgite | 19.5 |
| Sodium alkyl benzene sulfonate | 0.5 |

These ingredients are blended and micropulverized to a particle size essentially less than 50 microns.

This formulation is applied at the rate of 25 lbs. active per acre for the control of annual and perennial broad leaf and grass weeds and seedling woody plants in areas where drift is not a problem.

Other compounds which can be formulated and used in like manner are as follows:

3-cyclohexyl-5,6-trimethylene-1-trichloromethylthiouracil
5-bromo-3-sec. butyl-1,6-dimethyluracil
5-chloro-3-cyclohexyl-1,6-dimethyluracil.

We claim:
1. A method for the control of undesirable vegetation, said method comprising applying to a locus to be protected from such vegetation a herbicidally effective amount of a compound having the formula

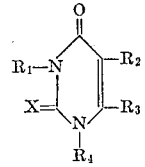

where
$R_1$ is selected from the group consisting of alkyl of 1 through 10 carbon atoms,
substituted alkyl of 1 through 8 carbon atoms,
wherein said substituent is selected from the group consisting of bromine, chlorine, hydroxy, alkoxy, alkoxycarbonyl, and cyano,
aryl of 5 through 10 carbon atoms,
substituted phenyl, wherein said substituent is selected from the group consisting of
chlorine, bromine, fluorine, phenyl, alkyl of 1 through 6 carbon atoms, chloroalkoxy of 1 through 5 carbon atoms, trifluoromethyl, 1,2-tetramethylene, and 1,2-trimethylene,
aralkyl of 5 through 13 carbon atoms,
substituted aralkyl of 5 through 13 carbon atoms,
wherein said substituent is selected from the group consisting of chlorine, nitro, alkyl, and alkoxy,
tetrahydronaphthylalkyl,
alkenyl of 3 through 8 carbon atoms,
alkinyl of 3 through 8 carbon atoms,
cycloalkyl of 3 through 12 carbon atoms,
substituted cycloalkyl of 3 through 12 carbon atoms,
wherein said substituent is selected from the group consisting of bromine, chlorine, methoxy, and alkyl,
cycloalkenyl of 4 through 12 carbon atoms,
substituted cycloalkenyl of 4 through 12 carbon atoms,
wherein said substituent is selected from the group consisting of bromine, chlorine, methoxy, and alkyl,
cycloalkyl alkyl of 4 through 13 carbon atoms,
(substituted cycloalkyl) alkyl of 4 through 13 carbon atoms, wherein said substituent is selected from the group consisting of bromine, chlorine, methoxy, and alkyl,
cycloalkenyl alkyl of 5 through 13 carbon atoms, and
(substituted cycloalkenyl)alkyl of 5 through 13 carbon atoms, wherein said substituent is selected from the group consisting of bromine, chlorine, methoxy, and alkyl;
$R_2$ is selected from the group consisting of hydrogen, chlorine, fluorine, bromine, iodine, methyl, ethyl, propyl, butyl, methoxy, ethoxy, propoxy, butoxy, nitro, alkoxymethyl of 2 through 6 carbon atoms, hydroxy alkyl of 1 through 6 carbon atoms, alkenyl of 3 through 6 carbon atoms, thiocyanato, cyano, thiolmethyl, methylthiomethyl, phenylthiomethyl, alkylthio of 1 through 4 carbon atoms, bromomethyl, fluoromethyl, chloromethyl, and carboxymethylthiomethyl;
$R_3$ is selected from the group consisting of hydrogen, chlorine, bromine, alkyl of 1 through 5 carbon atoms, chloroalkyl of 1 through 4 carbon atoms, bromoalkyl of 1 through 4 carbon atoms, and alkoxy of 1 through 5 carbon atoms;
$R_4$ is selected from the group consisting of alkyl of 1 through 5 carbon atoms,
substituted alkyl of 1 through 5 carbon atoms,
wherein said substituent is selected from the group consisting of bromine, chlorine, hydroxy, alkoxy, cyano, alkoxycarbonyl, and carboxy,
alkenyl of 2 through 5 carbon atoms,
alkynyl of 3 through 5 carbon atoms,
acyl of 1 through 10 carbon atoms,
substituted acyl of 1 through 10 carbon atoms,
wherein said substituent is selected from the group consisting of chlorine, phenyl, benzyl, and phenoxymethyl,
carbamyl of 1 through 7 carbon atoms,
substituted carbamyl of 1 through 7 carbon atoms,
wherein said substituent is selected from the group consisting of alkyl and phenyl,
thiocarbamyl of 1 through 7 carbon atoms,
substituted thiocarbamyl of 1 through 7 carbon atoms,
wherein said substituent is selected from the group consisting of alkyl and phenyl,
dialkylphosphoryl of 2 through 6 carbon atoms,
dialkylthionophosphoryl of 2 through 6 carbon atoms,
alkylthio of 1 through 12 carbon atoms,
substituted alkylthio of 1 through 12 carbon atoms,
wherein said substituent is selected from the group consisting of chlorine and bromine,
phenylthio of 6 through 10 carbon atoms,
substituted phenylthio of 6 through 10 carbon atoms,
wherein said substituent is selected from the group consisting of halo, nitro, and alkyl,
benzylthio of 7 through 12 carbon atoms,
substituted benzythio of 7 through 12 carbon atoms, wherein said substituent is selected from the group
consisting of chlorine and alkyl, and
glycosyl;
X is selected from the group consisting of oxygen and sulfur; with the proviso that $R_2$ and $R_3$ can be taken together as $—(CH_2)_n—$ to form a ring where $n$ is an integer of from 3 to 5, and with the further proviso that when $R_2$ is hydrogen, $R_1$ is selected from the group consisting of cycloalkyl of 3 through 12 carbon atoms, substituted cycloalkyl of 3 through 12 carbon atoms wherein said substituent is selected from the group consisting of bromine, chlorine, methoxy, and alkyl, cycloalkenyl of 4 through 12 carbon atoms, substituted cycloalkenyl of 4 through 12 carbon atoms wherein said substituent is selected from the group consisting of bromine, chlorine, methoxy, and alkyl, and alkyl of 3 through 10 carbon atoms.

2. The method of claim 1 in which the active herbicidal compound is 5-bromo-3-cyclohexyl-1,6-dimethyluracil.

3. The method of claim 1 in which the active herbicidal compound is 1-acetyl-5-bromo-3-isopropyl-6-methyluracil.

4. The method of claim 1 in which the active herbicidal compound is 5-bromo-3-cyclohexyl-6-methyl-1-(trichloromethylthio)uracil.

5. The method of claim 1 in which the active herbicidal compound is 3-cyclohexyl-1,6-dimethyluracil.

6. The method of claim 1 in which the active herbicidal compound is 5-bromo-3-sec.-butyl-6-methyl-1-(trichloromethylthio)uracil.

7. The method of claim 1 in which the active herbicidal compound is 1-acetyl-5-bromo-3-sec.-butyl-6-methyluracil.

8. The method of claim 1 in which the active herbicidal compound is 5-bromo-3-sec.-butyl-1,6-dimethyluracil.

9. The method of claim 1 in which the active herbicidal compound is 3-sec.-butyl-5-chloro-1,6-dimethyluracil.

10. The method of claim 1 in which the active herbicidal compound is 5-bromo-3-tert.-butyl-6-methyl-1-(trichloromethylthio)uracil.

11. The method of claim 1 in which the active herbicidal compound is 1-acetyl-5-bromo-3-tert.-butyl-6-methyluracil.

12. The method of claim 1 in which the active herbicidal compound is 3-tert.-butyl-5-chloro-1,6-dimethyluracil.

13. The method of claim 1 in which the active herbicidal compound is 3-tert.-butyl-5-chloro-6-methyl-1-(trichloromethylthio)uracil.

14. The method of claim 1 in which the active herbicidal compound is 5-bromo-3-(1-ethylpropyl)-6-methyl-1-(trichloromethylthio)uracil.

15. The method of claim 1 in which the active herbicidal compound is 1-acetyl-3-cyclohexyl-5,6-trimethyleneuracil.

16. A method for the control of undesirable vegetation said method comprising applying to a locus to be protected from such vegetation a herbicidally effective amount of a compound selected from the group consisting of (a) compounds of the formula

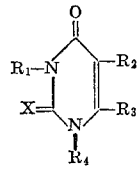

where
$R_1$ is selected from the group consisting of alkyl of 1 through 10 carbon atoms,
substituted alkyl of 1 through 8 carbon atoms,
wherein said substituent is selected from the group consisting of bromine, chlorine, hydroxy, alkoxy, alkoxycarbonyl, and cyano,
aryl of 5 through 10 carbon atoms, substituted phenyl,
wherein said substituent is selected from the group consisting of
chlorine, bromine, fluorine, phenyl, alkyl of 1 through 6 carbon atoms, chloroalkoxy of 1 through 5 carbon atoms, trifluoromethyl, 1,2-tetramethylene, and 1,2-trimethylene,
aralkyl of 5 through 13 carbon atoms, substituted aralkyl of 5 through 13 carbon atoms,
wherein said substituent is selected from the group consisting of chlorine, nitro, alkyl, and alkoxy,
tetrahydronaphthylalkyl,
alkenyl of 3 through 8 carbon atoms,
alkynyl of 3 through 8 carbon atoms,
cycloalkyl of 3 through 12 carbon atoms,
substituted cycloalkyl of 3 through 12 carbon atoms,
wherein said substituent is selected from the group consisting of bromine, chlorine, methoxy, and alkyl,
cycloalkenyl of 4 through 12 carbon atoms,
substituted cycloalkenyl of 4 through 12 carbon atoms,
wherein said substituent is selected from the group consisting of bromine, chlorine, methoxy, and alkyl,
cycloalkyl alkyl of 4 through 13 carbon atoms,
(substituted cycloalkyl)alkyl of 4 through 13 carbon atoms, wherein said substituent is selected from the group consisting of bromine, chlorine, methoxy, and alkyl,
cycloalkenyl alkyl of 5 through 13 carbon atoms, and
(substituted cycloalkenyl)alkyl of 5 through 13 carbon atoms, wherein said substituent is selected from the group consisting of bromine, chlorine, methoxy, and alkyl;
$R_2$ is selected from the group consisting of
hydrogen, chlorine, fluorine, bromine, iodine, methyl, ethyl, propyl, butyl, methoxy, ethoxy, propoxy, butoxy, nitro, alkoxymethyl of 2 through 6 carbon atoms, hydroxy alkyl of 1 through 6 carbon atoms, alkenyl of 3 through 6 carbon atoms, thiocyanato, cyano, thiolmethyl, methylthiomethyl, phenylthiomethyl, alkylthio of 1 through 4 carbon atoms, bromomethyl, fluoromethyl, chloromethyl, and carboxymethylthiomethyl;
$R_3$ is selected from the group consisting of
hydrogen, chlorine, bromine, alkyl of 1 through 5 carbon atoms, chloroalkyl of 1 through 4 carbon atoms, bromoalkyl of 1 through 4 carbon atoms, and alkoxy of 1 through 5 carbon atoms;
$R_4$ is selected from the group consisting of
alkyl of 1 through 5 carbon atoms,
substituted alkyl of 1 through 5 carbon atoms,
wherein said substituent is selected from the group consisting of bromine, chlorine, hydroxy, alkoxy, cyano, alkoxycarbonyl, and carboxy,
alkenyl of 2 through 5 carbon atoms,
alkynyl of 3 through 5 carbon atoms,
acyl of 1 through 10 carbon atoms,
substituted acyl of 1 through 10 carbon atoms,
wherein said substituent is selected from the group consisting of chlorine, phenyl, benzyl, and phenoxymethyl,
carbamyl of 1 through 7 carbon atoms,
substituted carbamyl of 1 through 7 carbon atoms,
wherein said substituent is selected from the group consisting of alkyl and phenyl,
thiocarbamyl of 1 through 7 carbon atoms,
substituted thiocarbamyl of 1 through 7 carbon atoms,
wherein said substituent is selected from the group consisting of alkyl and phenyl,
dialkylphosphoryl of 2 through 6 carbon atoms,
dialkylthionophosphoryl of 2 through 6 carbon atoms,
alkylthio of 1 through 12 carbon atoms,
substituted alkylthio of 1 through 12 carbon atoms,
wherein said substituent is selected from the group consisting of chlorine and bromine, phenylthio of 6 through 10 carbon atoms,
substituted phenylthio of 6 through 10 carbon atoms,
  wherein said substituent is selected from the group consisting of halo, nitro, and alkyl,
benzylthio of 7 through 12 carbon atoms,
substituted benzylthio of 7 through 12 carbon atoms,
  wherein said substituent is selected from the group consisting of chlorine and alkyl, and
glycosyl;

X is selected from the group consisting of oxygen and sulfur; with the proviso that $R_2$ and $R_3$ can be taken together as $-(CH_2)_n-$ to form a ring where $n$ is an integer of from 3 to 5, and with the further proviso that when $R_2$ is hydrogen, $R_1$ is selected from the group consisting of cycloalkyl of 3 through 12 carbon atoms, substituted cycloalkyl of 3 through 12 carbon atoms wherein said substituent is selected from the group consisting of bromine, chlorine, methoxy, and alkyl, cycloalkenyl of 4 through 12 carbon atoms, substituted cycloalkenyl of 4 through 12 carbon atoms wherein said substituent is selected from the group consisting of bromine, chlorine, methoxy, and alkyl, and alkyl of 3 through 10 carbon atoms;

(b) compounds of the formula

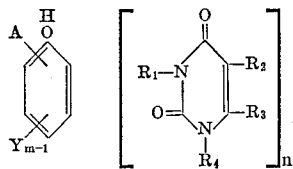

where $R_1$, $R_2$, $R_3$, and $R_4$ are defined as above; A is selected from the group consisting of hydrogen, bromine, chlorine, nitro, alkyl of 1 through 3 carbon atoms and an $-OR_5$ radical
  where $R_5$ is alkyl of 1 through 3 carbon atoms;
Y is selected from the group consisting of chlorine and alkyl of 1 through 3 carbon atoms;
$m$ is a whole number 1 through 5; and
$n$ is selected from the group consisting of ½, 1 and 2.

References Cited by the Examiner
UNITED STATES PATENTS

| | | | |
|---|---|---|---|
| 2,567,651 | 9/1951 | Papesh et al. | 260—260 |
| 2,688,020 | 8/1954 | MacKay et al. | 260—260 |
| 2,969,364 | 1/1961 | Lyttle | 71—2.5 X |
| 3,002,975 | 10/1961 | Slezak | 71—2.5 X |
| 3,078,154 | 2/1963 | Gysin et al. | 71—2.5 |
| 3,086,854 | 4/1963 | Harvey | 71—2.5 |

OTHER REFERENCES

Bonner et al., Prac. Natl. Acad. Sci. 25, 184–188. (1939).

Thompson et al., Botanical Gazette, 107, 475–507 (1946).

LEWIS GOTTS, *Primary Examiner.*

JULIAN S. LEVITT, *Examiner.*